US009838731B1

(12) United States Patent
Matias

(10) Patent No.: US 9,838,731 B1
(45) Date of Patent: Dec. 5, 2017

(54) SYSTEMS AND METHODS FOR AUDIO TRACK SELECTION IN VIDEO EDITING WITH AUDIO MIXING OPTION

(71) Applicant: GOPRO, INC., San Mateo, CA (US)

(72) Inventor: Joven Matias, Cardiff, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/093,701

(22) Filed: Apr. 7, 2016

(51) Int. Cl.
G11B 27/029 (2006.01)
H04N 21/43 (2011.01)
G11B 27/036 (2006.01)
G11B 27/34 (2006.01)
H04N 21/439 (2011.01)
H04N 21/435 (2011.01)
H04N 21/472 (2011.01)

(52) U.S. Cl.
CPC ....... H04N 21/4302 (2013.01); G11B 27/036 (2013.01); G11B 27/34 (2013.01); H04N 21/435 (2013.01); H04N 21/439 (2013.01); H04N 21/47205 (2013.01)

(58) Field of Classification Search
CPC ........... H04N 21/4302; H04N 21/4394; H04N 21/47205; G11B 27/005; G11B 27/036; G11B 27/34
USPC ........ 386/285, 207, 278, 282; 715/769, 716, 715/723; 84/625
See application file for complete search history.

(56) References Cited

U.S. PATENT DOCUMENTS 5,130,794 A 7/1992 Ritchey
6,337,683 B1 1/2002 Gilbert
6,593,956 B1 7/2003 Potts
7,222,356 B1 5/2007 Yonezawa
7,483,618 B1 1/2009 Edwards
8,446,433 B1 5/2013 Mallet
8,611,422 B1 12/2013 Yagnik
8,718,447 B2 5/2014 Yang
(Continued)

FOREIGN PATENT DOCUMENTS

WO 2001020466 3/2001
WO 2009040538 4/2009

OTHER PUBLICATIONS

PCT International Preliminary Report on Patentability for PCT/US2015/023680, dated Oct. 4, 2016, 10 pages.
(Continued)

Primary Examiner — Thai Tran
Assistant Examiner — Stephen Smith
(74) Attorney, Agent, or Firm — Sheppard Mullin Richter & Hampton LLP

(57) ABSTRACT

Video clips may be automatically edited to be synchronized for accompaniment by audio tracks. A preliminary version of a video clip may be made up from stored video content. Occurrences of video events within the preliminary version may be determined. A first audio track may include audio event markers. A first revised version of the video clip may be synchronized so that moments within the video clip corresponding to occurrences of video events are aligned with moments within the first audio track corresponding to audio event markers. Presentation of an audio mixing option may be effectuated on a graphical user interface of a video application for selection by a user. The audio mixing option may define volume at which the first audio track is played as accompaniment for the video clip.

20 Claims, 15 Drawing Sheets

(56) References Cited

U.S. PATENT DOCUMENTS

| | | |
|---|---|---|
| 8,730,299 B1 | 5/2014 | Kozko |
| 8,763,023 B1 | 6/2014 | Goetz |
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,564,173 B2 | 2/2017 | Swenson |
| 2004/0128317 A1 | 7/2004 | Sull |
| 2005/0025454 A1 | 2/2005 | Nakamura |
| 2006/0122842 A1* | 6/2006 | Herberger ............ G10H 1/368 704/278 |
| 2007/0173296 A1 | 7/2007 | Hara |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0253735 A1 | 10/2008 | Kuspa |
| 2008/0263433 A1* | 10/2008 | Eppolito ............ G11B 27/034 715/200 |
| 2008/0313541 A1 | 12/2008 | Shafton |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1* | 3/2010 | Gabrisko .......... G06F 17/30056 715/716 |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1* | 11/2010 | Sakai ................ G11B 27/34 715/723 |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0293250 A1 | 12/2011 | Deever |
| 2011/0320322 A1 | 12/2011 | Roslak |
| 2012/0014673 A1* | 1/2012 | O'Dwyer ............ G06F 3/0346 386/282 |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0191743 A1* | 7/2013 | Reid ................ G06F 3/04847 715/716 |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1* | 4/2014 | Dey ................ G06F 3/0488 715/723 |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |

(56) References Cited

U.S. PATENT DOCUMENTS

| | | |
|---|---|---|
| 2016/0088287 A1 | 3/2016 | Sadi |
| 2016/0098941 A1 | 4/2016 | Kerluke |
| 2016/0119551 A1 | 4/2016 | Brown |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0358603 A1 | 12/2016 | Azam |
| 2016/0366330 A1 | 12/2016 | Boliek |
| 2017/0006214 A1 | 1/2017 | Andreassen |

OTHER PUBLICATIONS

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US2015/041624, dated Dec. 17, 2015, 7 Pages.

PCT International Search Report and Written Opinion for PCT/US2015/023680, dated Oct. 6, 2015, 13 pages.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

PCT International Search Report and Written Opinion for PCT/US15/12086 dated Mar. 17, 2016, 20 pages.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Yang et al., "Unsupervised Extraction of Video Highlights Via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

Schroff et al., "FaceNet: A Unified Embedding for Face Recognition and Clustering," IEEE Conference on Computer Vision and Pattern Recognition (CVPR), 2016, 10 pgs.

Parkhi et al., "Deep Face Recognition," Proceedings of the British Machine Vision, 2015, 12 pgs.

Iandola et al., "SqueezeNet: AlexNet-level accuracy with 50x fewer parameters and <0.5MB model size," arXiv:1602.07360, 2016, 9 pgs.

Ioffe et al., "Batch Normalization: Accelerating Deep Network Training by Reducing Internal Covariate Shift," arXiv:1502.03167, 2015, 11 pgs.

He et al., "Deep Residual Learning for Image Recognition," arXiv:1512.03385, 2015, 12 pgs.

Han et al. Deep Compression: Compressing Deep Neural Networks with Pruning, Trained Quantization and Huffman Coding, International Conference on Learning Representations 2016, 14 pgs.

Ernoult, Emeric, "How to Triple Your YouTube Video Views with Facebook", SocialMediaExaminer.com, Nov. 26, 2012, 16 pages.

Ricker, "First Click: TomTom's Bandit camera beats GoPro with software" Mar. 9, 2016 URL: http://www.theverge.com/2016/3/9/11179298/tomtom-bandit-beats-gopro (6 pages).

PCT International Search Report and Written Opinion for PCT/US15/18538, dated Jun. 16, 2015, 26 pages.

PCT International Search Report for PCT/US17/16367 dated Apr. 14, 2017 (2 pages).

PCT International Search Reort for PCT/US15/18538 dated Jun. 16, 2015 (2 pages).

* cited by examiner

SYSTEMS AND METHODS FOR AUDIO TRACK SELECTION IN VIDEO EDITING WITH AUDIO MIXING OPTION

FIELD

This disclosure relates to systems and methods that automatically edits video clips to synchronize accompaniment by audio tracks.

BACKGROUND

Video editing applications may allow users to manually edit video clips to synchronize the video clips to audio tracks. Finding audio tracks and editing video clips to synchronize to audio tracks may be time consuming and may discourage users from synchronizing video clips to audio tracks.

SUMMARY

This disclosure relates to automatically editing video clips to synchronize accompaniment by audio tracks. A system that automatically edits video clips to synchronize accompaniment by audio tracks may include one or more of physical processors, storage medium, and/or other components. The physical processor(s) may be configured to execute one or more computer program components. The storage medium may store video content and initial instructions. The initial instructions may define a preliminary version of a video clip made up from the stored video content. The initial instructions may indicate specific portions of the video content to be included in the preliminary version of the video clip and an order in which the specific portions of the video content should be presented. The video clip may be divided into video segments. The video segments may include a first video segment, a second video segment, and/or other video segments.

In one aspect of the disclosure, video clips may be automatically edited to be synchronized for accompaniment by different audio tracks. Video clips may be automatically edited by determining occurrences of video events within the preliminary version of the video clip. A repository of audio tracks including a first audio track and a first set of audio event markers may be accessed. Revised instructions defining a revised version of the video clip may be determined. The revised version of the video clip may be synchronized with the first audio track so that one or more moments within the video clip corresponding to one or more occurrences of video events are aligned with one or more moments within the first audio track corresponding to one or more audio event markers. Responsive to the user's selection of the first audio track, playback of the revised version of the video clip, along with the first audio track as accompaniment, may be effectuated.

The computer program components may include one or more of an occurrence component, an audio track component, a GUI component, a revised instruction component, a playback component, and/or other components.

The occurrence component may be configured to determine occurrences of video events within the preliminary version of the video clip. The individual occurrences of video events may correspond to different moments within the preliminary version of the video clip.

In some implementations, one or more of the video events may include one or more of a video edit, a user-specified video event, a video transition, a moment of interest, and/or other video events at corresponding moments within the preliminary version of the video clip. In some implementations, a video transition may include one or more of a change in scene, a change in action, a change in view, and/or other video transitions at corresponding moments within the preliminary version of the video clip.

The audio track component may be configured to access a repository of audio tracks. The repository of audio tracks may include a first audio track, other audio tracks, a first set of audio event markers including one or more audio event markers, and/or other sets of audio event markers including one or more audio event markers. The individual audio event markers may correspond to different moments within the first audio track.

In some implementations, one or more of the audio event markers may indicate one of more of a beat, a tempo, a rhythm, an instrument, a volume, a vocal, a frequency, a style, a start, an end, and/or other audio events of the first audio track at corresponding moments within the first audio track. In some implementations, one or more of the audio event markers may indicate one of more of a change in one of more of a beat, a tempo, a rhythm, an instrument, a volume, a vocal, a frequency, a style, a start, an end, and/or other audio events of the first audio track at corresponding moments within the first audio track. In some implementations, one or more of the audio event markers may include a user-specified audio event marker. A user-specified audio event marker may refer to an audio event marker indicating an audio event within an audio track based on user input. For example, a user may provide input indicating one or more of a beat, a tempo, a rhythm, an instrument, a volume, a vocal, a frequency, a style, a start, an end, and/or other audio events of the audio tracks at corresponding moments within the audio tracks.

In some implementations, the audio track component may be configured to obtain an audio filter parameter. The audio filter parameter may define one or more criteria for filtering one or more audio tracks. The audio track component may be configured to determine, by comparing the individual audio tracks with the audio filter parameter, whether the individual audio tracks meet the audio filter parameter. In some implementations, the audio track component may be configured to determine the audio filter parameter based on user input.

In some implementations, the audio filter parameter may include one or more of a beat parameter, a tempo parameter, a rhythm parameter, an instrument parameter, a volume parameter, a vocal parameter, a frequency parameter, a style parameter, a genre parameter, a performer parameter, a composer parameter, a lyric parameter, a user-specified audio filter parameter, and/or other audio filter parameters.

The GUI component may be configured to effectuate presentation of the audio tracks on a graphical user interface of a video application for selection by a user to use as accompaniment for the video clip. In some implementations, the GUI component may be configured to effectuate presentation of the audio tracks that meets the audio filter parameter on the graphical user interface of the video application for selection by the user to use as accompaniment for the video clip.

The GUI component may be configured to effectuate presentation of an audio mixing option on the graphical user interface of the video application. The audio mixing option may be presented on the graphical user interface for selection by the user. The audio mixing option may define volume at which one or more audio tracks are played as accompaniment for the video clip.

In some implementations, the audio mixing option may include one or more options to set a percentage of the volume at which one or more audio tracks are played as accompaniment for the video clip. The video clip may include one or more audio, and an inverse relationship may exist between volume at which one or more audio of the video clip are played and the volume at which one or more audio tracks are played. For example, a hundred percent of the volume for an audio track may correspond to a zero percent of the volume for an audio of the video clip. A zero percent of volume for an audio track may correspond to a hundred percent of volume for an audio of the video clip. A fifty percent of volume for an audio track may correspond to a fifty percent of volume for an audio of the video clip.

In some implementations, the audio mixing option may include one or more option to decrease the volume at which one or more audio tracks are played at one or more moments in the video clip corresponding to one or more moments of interest. The video clip may include one or more audio, and an inverse relationship exists between volume at which one or more audio of the video clip are played and the volume at which one or more audio tracks are played. A moment in the video clip corresponding to a moment of interest may include a first duration of time before a point in time corresponding to the moment of interest. A moment in the video clip corresponding to a moment of interest may include a second duration of time after the point in time corresponding to the moment of interest.

The revised instruction component may be configured to determine revised instructions defining a revised version of the video clip that is synchronized with the first audio track. The revised version of the video clip may be synchronized so that one or more moments within the video clip corresponding to one or more occurrences of video events are aligned with one or more moments within the first audio track corresponding to one or more audio event markers.

In some implementations, determining revised instructions may include changing the initial instructions to include one or more of a video timing effect, a video fading effect, and/or other video effects. In some implementations, a video timing effect may include one or more of a slow motion effect, a fast motion effect, a time freeze effect, and/or other video timing effects. In some implementations, a video fading effect may include one or more of a fade-in effect, a fade-out effect, and/or other video fading effects.

The revised instruction component may be configured to determine one or more changes to one or more audio tracks to which a video clip is synchronized. A change to an audio track may include one or more of a change to a duration of the audio track, a change in a tempo of the audio track, a change in one or more of the audio event markers, a selection of a different audio track, a change in a moment at which synchronization begins, a change in a moment at which synchronization ends, and/or other changes to the audio track. In some implementations, an audio track may include a first audio and a change to the audio track may include one or more of adding a second audio to the audio track, removing the first audio from the audio track, and/or other changes to the audio track.

The revised instruction component may be configured to determine second revised instructions defining second revised version of the video clip that is synchronized with the changed audio track. The second revised version of the video clip may be synchronized so that one or more moments within the video clip corresponding to one or more occurrences of video events are aligned with one or more moments within the changed audio track corresponding to one or more audio event markers.

The playback component may be configured to, responsive to a user's selection of the first audio track, effectuate playback of the revised version of the video clip along with the first audio track as accompaniment. The first audio track may be played at the volume defined by the user selection of the audio mixing option. A user may be presented with playback of the revised version of the video clip through the graphical user interface of the video application.

In one aspect of the disclosure, video clips may be automatically edited to be synchronized for accompaniment by similar audio tracks. Video clips may be automatically edited by determining occurrences of video events within the preliminary version of the video clip. A repository of audio tracks including a first audio track, a second audio track, a first set of audio event markers, and a second set of audio event markers may be accessed. First revised instructions defining a first revised version of the video clip may be determined. The first revised version of the video clip may be synchronized with the first audio track so that one or more moments within the first video segment of the video clip corresponding to one or more occurrences of video events are aligned with one or more moments within the first audio track corresponding to one or more audio event marker. Responsive to a user's selection of the first audio track, playback of the first revised version of the video clip, along with the first audio track as accompaniment, may be effectuated.

One or more other audio tracks similar to the first audio track may be identified. One or more other audio tracks may include the second audio track. Second revised instructions defining a second revised version of the video clip may be determined. The second revised version of the video clip may be synchronized with the second audio track so that one or more moments within the second video segment of the video clip corresponding to one or more occurrences of video events are aligned with one or more moments within the second audio track corresponding to one or more audio event marker. Responsive to the user's selection of the second audio track, playback of the second revised version of the video clip, along with the second audio track as accompaniment, may be effectuated.

The computer program components many include one or more of an occurrence component, an audio track component, a GUI component, a revised instruction component, a playback component, a similar audio track component, and/or other components.

The occurrence component may be configured to determine occurrences of video events within the preliminary version of the video clip. The individual occurrences of video events may correspond to different moments within the preliminary version of the video clip.

In some implementations, one or more of the video events may include one or more of a video edit, a user-specified video event, a video transition, a moment of interest, and/or other video events at corresponding moments within the preliminary version of the video clip. In some implementations, a video transition may include one or more of a change in scene, a change in action, a change in view, and/or other video transitions at corresponding moments within the preliminary version of the video clip.

The audio track component may be configured to access a repository of audio tracks. The repository of audio tracks may include a first audio track, a second audio track, other audio tracks, a first set of audio event markers including one or more audio event markers, a second set of audio event markers including one or more audio event markers, and/or other sets of audio event markers including one or more audio event markers. The individual audio event markers of the first set of audio event markers may correspond to different moments within the first audio track. The individual audio event markers of the second set of audio event markers may correspond to different moments within the second audio track.

In some implementations, one or more of the audio event markers may indicate one of more of a beat, a tempo, a rhythm, an instrument, a volume, a vocal, a frequency, a style, a start, an end, and/or other audio events of the audio tracks at corresponding moments within the audio tracks. In some implementations, one or more of the audio event markers may indicate one of more of a change in one of more of a beat, a tempo, a rhythm, an instrument, a volume, a vocal, a frequency, a style, a start, an end, and/or other audio events of the audio tracks at corresponding moments within the audio tracks. In some implementations, one or more of the audio event markers may include a user-specified audio event marker.

In some implementations, the audio track component may be configured to obtain an audio filter parameter. The audio filter parameter may define one or more criteria for filtering one or more audio tracks. The audio track component may be configured to determine, by comparing the individual audio tracks with the audio filter parameter, whether the individual audio tracks meet the audio filter parameter. In some implementations, the audio track component may be configured to determine the audio filter parameter based on user input.

In some implementations, the audio filter parameter may include one or more of a beat parameter, a tempo parameter, a rhythm parameter, an instrument parameter, a volume parameter, a vocal parameter, a frequency parameter, a style parameter, a genre parameter, a performer parameter, a composer parameter, a lyric parameter, a user-specified audio filter parameter, and/or other audio filter parameters.

The GUI component may be configured to effectuate presentation of the audio tracks on a graphical user interface of a video application for selection by a user to use as accompaniment for the first video segment of the video clip. In some implementations, the GUI component may be configured to effectuate presentation of the audio tracks that meets the audio filter parameter on the graphical user interface of the video application for selection by the user to use as accompaniment for the first video segment of the video clip.

The GUI component may be configured to effectuate presentation of one or more audio tracks similar to the first audio track on the graphical user interface of the video application for selection by the user to use as accompaniment for the second video segment of the video clip.

The revised instruction component may be configured to determine first revised instructions defining a first revised version of the video clip that is synchronized with the first audio track. The first revised version of the video clip may be synchronized so that one or more moments within the first video segment of the video clip corresponding to one or more occurrences of video events are aligned with one or more moments within the first audio track corresponding to one or more audio event markers.

In some implementations, determining revised instructions may include changing the initial instructions to include one or more of a video timing effect, a video fading effect, and/or other video effects. In some implementations, a video timing effect may include one or more of a slow motion effect, a fast motion effect, a time freeze effect, and/or other video timing effects. In some implementations, a video fading effect may include one or more of a fade-in effect, a fade-out effect, and/or other video fading effects.

The revised instruction component may be configured to determine second revised instructions defining a second revised version of the video clip that is synchronized with the second audio track. The second revised version of the video clip may be synchronized so that one or more moments within the second video segment of the video clip corresponding to one or more occurrences of video events are aligned with one or more moments within the second audio track corresponding to one or more audio event markers.

The playback component may be configured to, responsive to the user's selection of the first audio track, effectuate playback of the first revised version of the video clip along with the first audio track as accompaniment. The first audio track may be played at volume defined by user selection of audio mixing option. A user may be presented with playback of the first revised version of the video clip through the graphical user interface of the video application.

The playback component may be configured to, responsive to the user's selection of the second audio track, effectuate playback of the second revised version of the video clip along with the second audio track as accompaniment. The second audio track may be played at volume defined by user selection of audio mixing option. A user may be presented with playback of the second revised version of the video clip through the graphical user interface of the video application.

The similar audio track component may be configured to identify one or more other audio tracks similar to the first audio track. One or more other audio tracks similar to the first audio track may be identified based on an audio characteristic parameter of the first audio track and audio characteristic parameters of the other audio tracks. The other audio tracks may include the second audio track, and/or other audio tracks. The audio characteristic parameters may define one or more characteristics of the audio tracks. In some implementations, the similar audio track component may be configured to determine the audio characteristic parameter of the first audio track based on user input.

In some implementations, the audio characteristic parameter of the first audio track may include one or more of a beat parameter, a tempo parameter, a rhythm parameter, an instrument parameter, a volume parameter, a vocal parameter, a frequency parameter, a style parameter, a genre parameter, a performer parameter, a composer parameter, a lyric parameter, and/or other audio characteristic parameters.

In some implementations, the repository of audio tracks may include a third audio track. The similar audio track component may be configured to register the user's rejection of the third audio track, and the identification of the one or more other audio tracks similar to the first audio track may include excluding from the identification audio tracks similar to the third audio track. Audio tracks similar to the third audio track may be excluded based on an audio characteristic parameter of the third audio track and the audio characteristic parameters of the other audio tracks.

In some implementations, the similar audio track component may be configured to determine the audio characteristic parameter of the third audio track based on user input. In some implementations, the audio characteristic parameter of the first audio track and the audio characteristic parameter of the third audio track may be of same type. In some implementations, the audio characteristic parameter of the first audio track and the audio characteristic parameter of the third audio track may be of different types.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
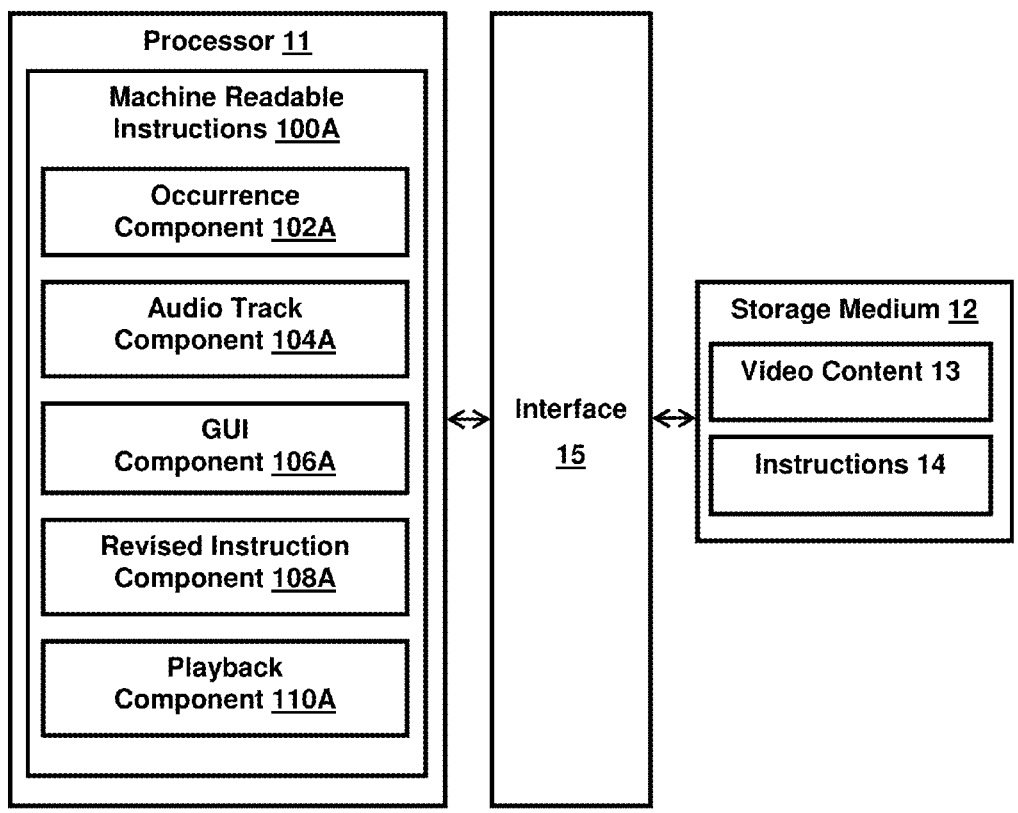
FIG. 1A illustrates a system that automatically edits video clips to synchronize accompaniment by different audio tracks.
Figure 1B:
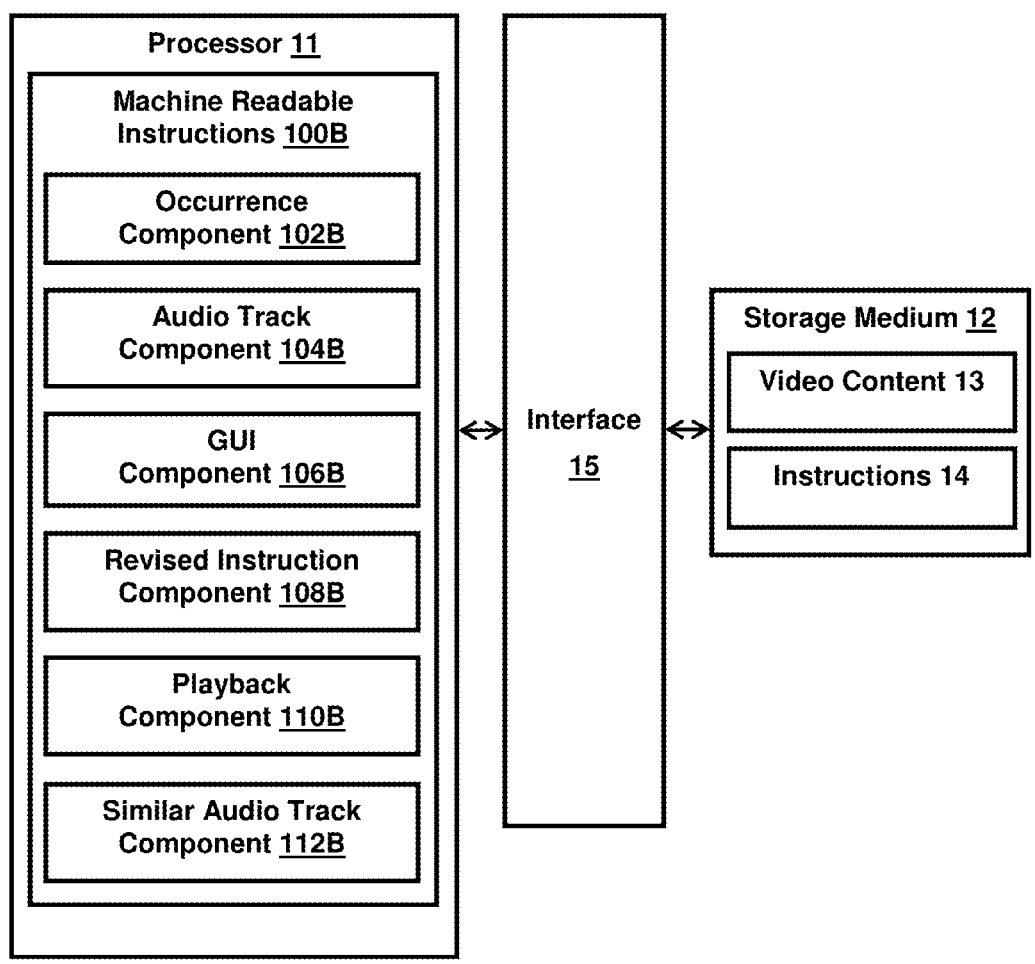
FIG. 1B illustrates a system that automatically edits video clips to synchronize accompaniment by similar audio tracks.

FIGS. 1A-1B illustrate systems 10A-10B that automatically edit video clips to synchronize accompaniment by audio tracks. Systems 10A-10B may include one or more of processor 11, storage medium 12, interface 15 (e.g., bus, wireless interface, etc.), and/or other components. Storage medium 12 may store video content 13, instructions 14, and/or other information. Instructions 14 may include initial instructions, revised instructions, and/or other instructions.

Storage medium 12 may include electronic storage medium that electronically stores information. Storage medium 12 may store software algorithms, information determined by processor 11, information received remotely, and/or other information that enables systems 10A-10B to function properly. For example, storage medium 12 may store information relating to video content 13, instructions 14, video events, video edits, audio tracks, audio event markers, and/or other information. Systems 10A-10B may include electronic storage separate from storage medium 12. Electronic storage separate from storage medium 12 may perform one or more of the functionalities of storage medium 12 discussed above.

Figure 3:
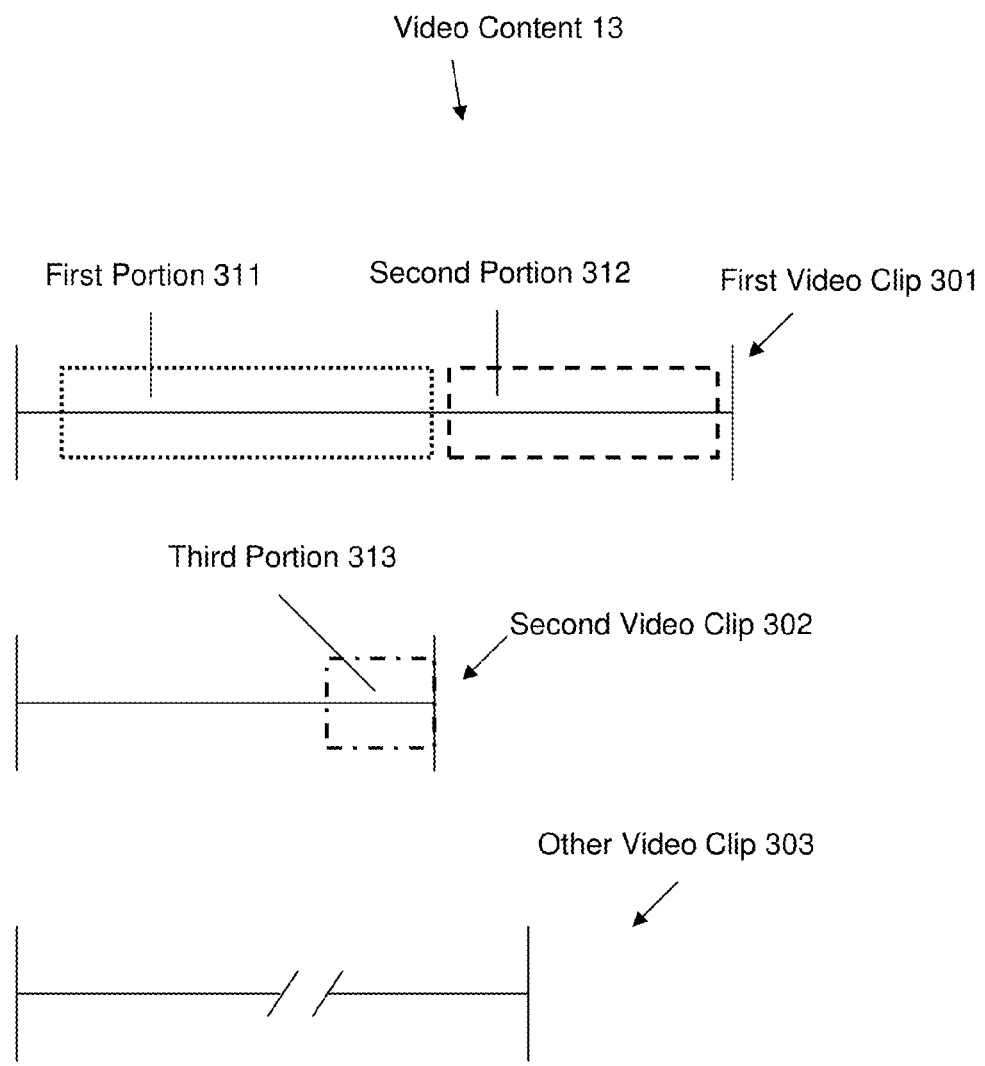
FIG. 3 illustrates an example of video content.

Storage medium 12 may store video content 13, instructions 14, and/or other information. Video content 13 may refer to media content that may be observed visually. Video content 13 may include one or more of an image, a series of images, a video clip, a sequence of video clips, and/or other video content. For example, as shown in FIG. 3, video content 13 may include first video clip 301, second video clip 302, other video clip 303, and/or other video content. First video clip 301 may include first portion 311 and second portion 312. Second video clip 302 may include third portion 313. First video clip 301 may be longer than second video clip 302. Other video clip 303 may be longer or shorter than first video clip 301. Other lengths of video clips are contemplated. Playback of video content 13 may be effectuated through a graphical user interface of a video application.

Instructions 14 may include initial instructions, revised instructions, and/or other instructions. Instructions 14 may define one or more versions of a video clip made up from video content 13. For example, initial instructions may indicate specific portions of video content 13 to be included in a preliminary version of the video clip and an order in which the specific portions of video content 13 should be presented. Revised instructions may indicate specific portions of video content 13 to be included in a revised version of the video clip and an order in which the specific portions of video content 13 should be presented. For portions of video content 13 included in the one or more versions of the video clip, instructions 14 may specify the beginning and the end of the portion, and where in the one or more versions of the video clip the portion appears.

Instructions 14 may include information relating to video and/or audio in one or more versions of the video clip. For example, instructions 14 may include information relating to selection of video content 13, video duration, shortened video duration, extended video duration, addition/removal of video/portion of video, video effects, video orientation, video quality, video play rate (e.g., frame rate, etc.), and/or other information relating to video in one or more versions of the video clip. Instructions 14 may include information relating to selection of audio, audio volume, audio tempo, audio duration, shortened audio duration, extended audio duration, addition/removal of audio/portion of audio, audio effects, audio quality, audio play rate, and/or other information relating to audio in one or more versions of the video clip.

Figure 4:
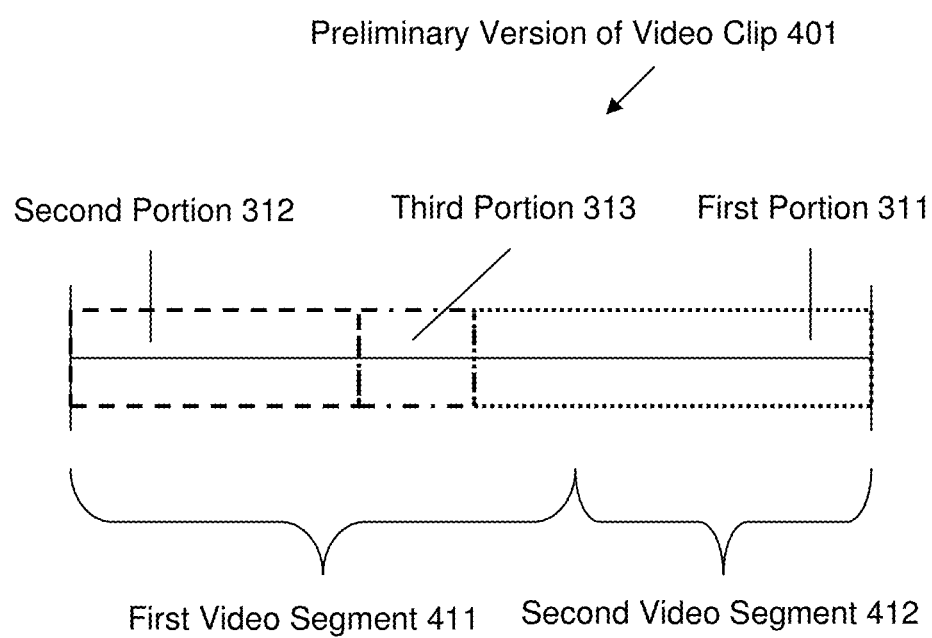
FIG. 4 illustrates an example of a video clip.

FIG. 4 illustrates a non-limiting example of preliminary version of video clip 401. Initial instructions may define preliminary version of video clip 401 made up from video content 13. Initial instructions may define the beginnings and the ends of first portion 311 (a part of first video clip 301 as shown in FIG. 3), second portion 312 (a part of first video clip 301 as shown in FIG. 3), and third portion 313 (a part of second video clip 302 as shown in FIG. 3). As shown in FIG. 4, initial instructions may indicate that in preliminary version of video clip 401, the portions of video content 13 are to be presented in the following order: second portion 312, third portion 313, and first portion 311. Preliminary version of video clip 401 may be made up from a single portion of a video clip (e.g., a portion of first video clip 301, a portion of second video clip 302, a portion of other video clip 303, etc.), or a single video clip (e.g., first video clip 301, second video clip 302, other video clip 303, etc.). Initial instructions may include other instructions relating to preliminary version of video clip 401.

A video clip may be divided into one or more video segments. A video segment may be exclusive of other video segments (i.e., one video segment may not overlap with another video segment) or inclusive of other video segments (i.e., one video segment may overlap with another video segment). For example, preliminary version of video clip 401 may include first video segment 411, second video segment 412, and/or other segments. First video segment 411 may not overlap with second video segment 412. Second video segment 412 may follow first video segment 411. First video segment 411 may be longer than second video segment 412. Other lengths, arrangements, and combinations of video segments are contemplated.

Processor 11 may be configured to provide information processing capabilities in systems 10A-10B. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100A-100B to facilitate automatically editing video clips to synchronize accompaniment by audio tracks.

In one aspect of the disclosure, video clips may be automatically edited to be synchronized for accompaniment by different audio tracks. Video clips may be automatically edited by determining occurrences of video events within the preliminary version of the video clip. A repository of audio tracks including a first audio track and a first set of audio event markers may be accessed. Revised instructions defining one or more revised versions of the video clip may be determined. A revised version of the video clip may be synchronized with the first audio track so that one or more moments within the video clip corresponding to one or more occurrences of video events are aligned with one or more moments within the first audio track corresponding to one or more audio event markers. Responsive to a user's selection of the first audio track, playback of the revised version of the video clip, along with the first audio track as accompaniment, may be effectuated.

Referring to FIG. 1A, system 10A may be configured to automatically edit video clips to synchronize accompaniment by different audio tracks. Machine readable instructions 100A may include one or more of occurrence component 102A, audio track component 104A, GUI component 106A, revised instruction component 108A, playback component 110A, and/or other components.

Occurrence component 102A may be configured to determine occurrences of video events within a video clip. A video event may refer to a particular visual within the video clip. A particular visual may be observed visually at a point in time within the video clip or within a duration of time within the video clip. A video event may correspond to one or more moments within the video clip. A moment within the video clip may include a point in time within the video clip or a duration of time within the video clip.

Occurrence component 102A may determine occurrences of video events through analysis of a video clip and/or a file associated with the video clip (e.g., metadata file, video edit list file, etc.). For example, occurrence component 102A may analyze content of a video clip to determine video events based on one or more characteristics of content captured within the video clip (e.g., a location of capture, a time of capture, a date of capture, an action depicted within the content, one or more objects depicted within the content, and/or an orientation of an image/video capture device associated with capture, etc.). In some implementations, one or more characteristics of captured content may be determined by using systems and/or methods described in U.S. patent application Ser. No. 14/918,338, entitled "SYSTEM AND METHOD OF PROVIDING RECOMMENDATIONS OF MOMENTS OF INTEREST WITHIN VIDEO CLIPS POST CAPTURE," filed Oct. 20, 2015, the foregoing being incorporated herein by reference in its entirety, and/or U.S. patent application Ser. No. 14/918,321, entitled "SYSTEM AND METHOD OF GENERATING VIDEO FROM VIDEO CLIPS BASED ON MOMENTS OF INTEREST WITHIN THE VIDEO CLIPS," filed Oct. 20, 2015, the foregoing being incorporated herein by reference in its entirety. Occurrence component 102A may analyze a video edit file containing lists of video edits for a video clip to determine video events based on one or more characteristics of video edits (e.g., types of video edits, lengths of video edits, locations of video edits, etc.). Other methods of determining occurrences of video events are contemplated.

In some implementations, one or more video events may include one or more of a video edit, a user-specified video event, a video transition, a moment of interest, and/or other video events at corresponding moments within a video clip. A video edit may refer to a change in a video clip after the capture of the video content defined by the video clip. A video edit may correspond to a point in time within a video clip, a duration of time within the video clip, or the entire duration of the video clip. By way of non-limiting example, a video edit may include one or more of changing the length of a video clip, adding/removing a part of a video clip, rearranging a part of a video clip, changing a color, changing a speed, adding/removing/changing a transition effect, adding/removing/changing a special effect, and/or other video edits.

A user-specified video evident may refer to a video event designated by a user. A user may designate a video event during or after the capture of the video content defined by the video clip. For example, a user capturing a video of a skier may designate one or more moments corresponding to a jump by the skier by operating an interface of a capture device. The user may designate one or more moments corresponding to a flip by the skier while replaying the captured video on the capture device or on a video application.

A video transition may refer to a change in the content of a video clip. A change in the content of a video clip may correspond to a point in time within a video clip or a duration of time within the video clip. By way of non-limiting example, a video transition may include one or more of a change in scene, a change in action, a change in view, and/or other video transitions within a video clip.

A moment of interest may refer to a video content that may be of particular interest and/or of preference to a user. A moment of interest may correspond to a point in time within a video clip or a duration of time within the video clip. By way of non-limiting example, a moment of interest may include a particular action, a particular pose, a particular stance, a particular view, a particular time, a particular interest and/or other moments of interest. In some implementations, a moment of interest may be determined by using systems and/or methods described in U.S. patent application Ser. No. 14/918,338, entitled "SYSTEM AND METHOD OF PROVIDING RECOMMENDATIONS OF MOMENTS OF INTEREST WITHIN VIDEO CLIPS POST CAPTURE," filed Oct. 20, 2015, and/or U.S. patent application Ser. No. 14/918,321, entitled "SYSTEM AND METHOD OF GENERATING VIDEO FROM VIDEO CLIPS BASED ON MOMENTS OF INTEREST WITHIN THE VIDEO CLIPS," filed Oct. 20, 2015, incorporated supra.

Figure 5:
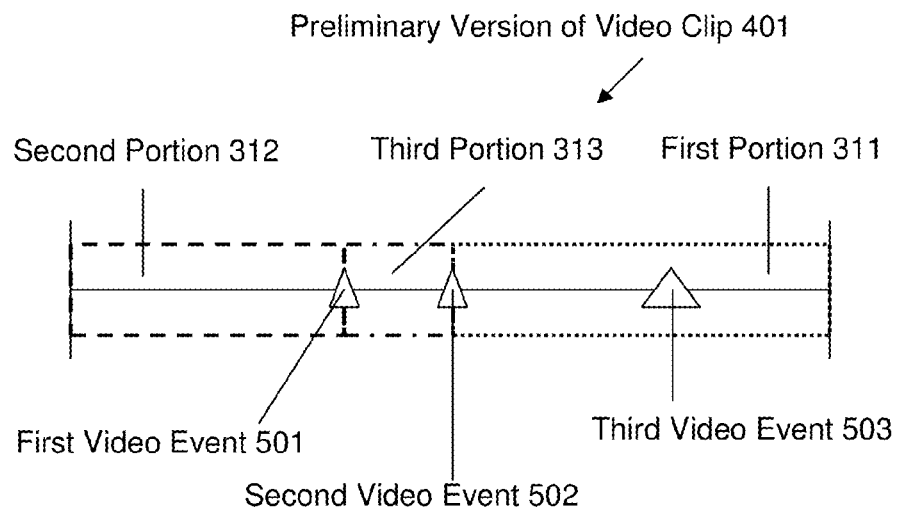
FIG. 5 illustrates an example of video events in a video clip.

FIG. 5 illustrates a non-limiting example of video events 501-503 within preliminary version of video clip 401. Preliminary version of video clip 401 may include first video event 501, second video event 502, third video event 503, and/or other video events. First video event 501 may correspond to a point in time of transition from second portion 312 to third portion 313 in preliminary version of video clip 401. Second video event 502 may correspond to a point in time of transition from third portion 313 to first portion 311 in preliminary version of video clip 401. Third video event 503 may correspond to a duration of time in which a moment of interest occurs in preliminary version of video clip 401. In some implementations, third video event 503 may correspond to a point in time of highpoint of a moment of interest in preliminary version of video clip 401. Other types of video event markers are contemplated.

Audio track component 104A may be configured to access a repository of audio tracks. The repository of audio tracks may refer to one or more locations storing one or more audio tracks. The repository of audio tracks may be located in one or more of storage medium 12, an electronic storage separate from storage medium 12, a network, a local computing device, a remote computing device, and/or other locations. For example, audio track component 104A may access a repository of audio tracks by streaming information regarding the repository of audio track/the audio tracks from a remote location over a network.

The repository of audio tracks may include one or more audio tracks, and one or more sets of audio event markers. Audio tracks may be of different lengths. Audio tracks may be shorter than a video clip, longer than a video clip, or of same duration as a video clip. For example, audio tracks may be shorter than a video clip and the methodologies of selecting audio tracks described herein may be repeated to select multiple audio tracks to provide accompaniment for the entire duration of the edit video clip. In some implementations, audio tracks may be of fixed length(s). As non-limiting examples, audio tracks may have lengths of one or more of 8 seconds, 15 seconds, 30 seconds, 45 seconds, and/or 60 seconds. Other fixed length(s) of audio tracks are contemplated.

An audio event marker may refer to one or more indicators providing information about an audio track at one or more moments within the audio track. A moment within the audio track may include a point in time within the audio track or a duration of time within the audio track. An audio event marker may provide information about one or more characteristics of an audio track at a point in time within the audio track or a duration of time within the audio track. By way of non-limiting example, one or more audio event markers may indicate one of more of a beat, a tempo, a rhythm, an instrument, a volume, a vocal, a frequency, a style, a start, an end, and/or other audio events within the audio track. One or more audio event markers may indicate one of more of a change in one of more of a beat, a tempo, a rhythm, an instrument, a volume, a vocal, a frequency, a style, a start, an end, and/or other audio events within the audio track. One or more audio event markers may include a user-specified audio event marker.

Figure 6A:
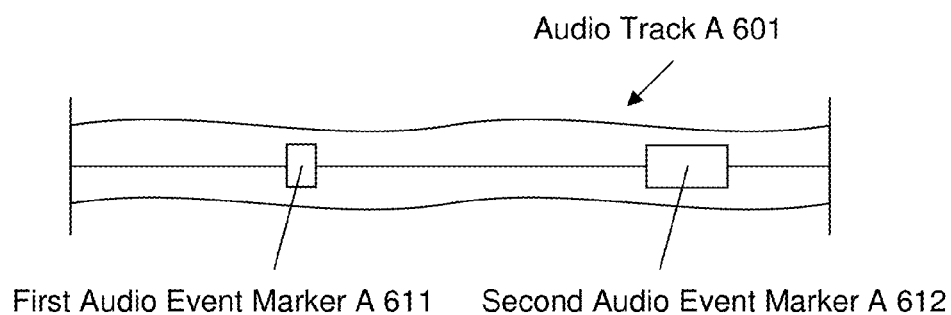
FIGS. 6A-6B illustrate examples of audio event markers in audio tracks.

FIG. 6A illustrates a non-limiting example of audio event markers A 611-612 within audio track A 601. Audio track A 601 may include first audio event maker A 611, second audio event marker A 612, and/or other audio event markers. First audio event marker A 611 may correspond to a point in time of volume increase in audio track A 601. Second audio event marker A 612 may correspond to a duration of time in which the tempo of audio track A 601 is slower than other parts of audio track A 601. Other types of audio event markers are contemplated.

Figure 6B:
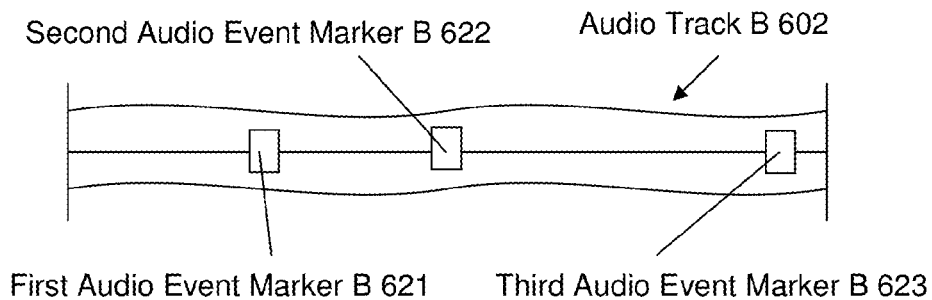

FIG. 6B illustrates a non-limiting example of audio event markers B 621-623 within audio track B 602. Audio track B 602 may include first audio event marker B 621, second audio event marker B 622, third audio event marker B 623, and/or other audio event markers. First audio event marker B 621 may correspond to a point in time of volume decrease in audio track B 602. Second audio event marker B 622 may correspond to a point in time of change in vocal in audio track B 602. Third audio event marker B 623 may correspond to a point in time for a user-specified audio event marker in audio track B 602. Other types of audio event markers are contemplated.

In some implementations, audio track component 104A may be configured to obtain an audio filter parameter. The audio filter parameter may define one or more criteria for filtering one or more audio tracks. The audio filter parameter may include one or more parameters that characterize an audio track at a point in time within the audio track, a duration of time within the audio track, or the entire duration of the audio track. For example, the audio filter parameter may include one or more of a beat parameter, a tempo parameter, a rhythm parameter, an instrument parameter, a volume parameter, a vocal parameter, a frequency parameter, a style parameter, a genre parameter, a performer parameter, a composer parameter, a lyric parameter, a user-specified audio filter parameter, and/or other audio filter parameters. The audio filter parameter may be programmed into audio track component 104A, updated by audio track component 104A, obtained by audio track component 104A from storage medium 12 and/or other electronic storage, obtained by audio track component 104A from remote location (e.g., a server, a network, etc.), and/or obtained by audio track component 104A in other ways.

Figure 8A:
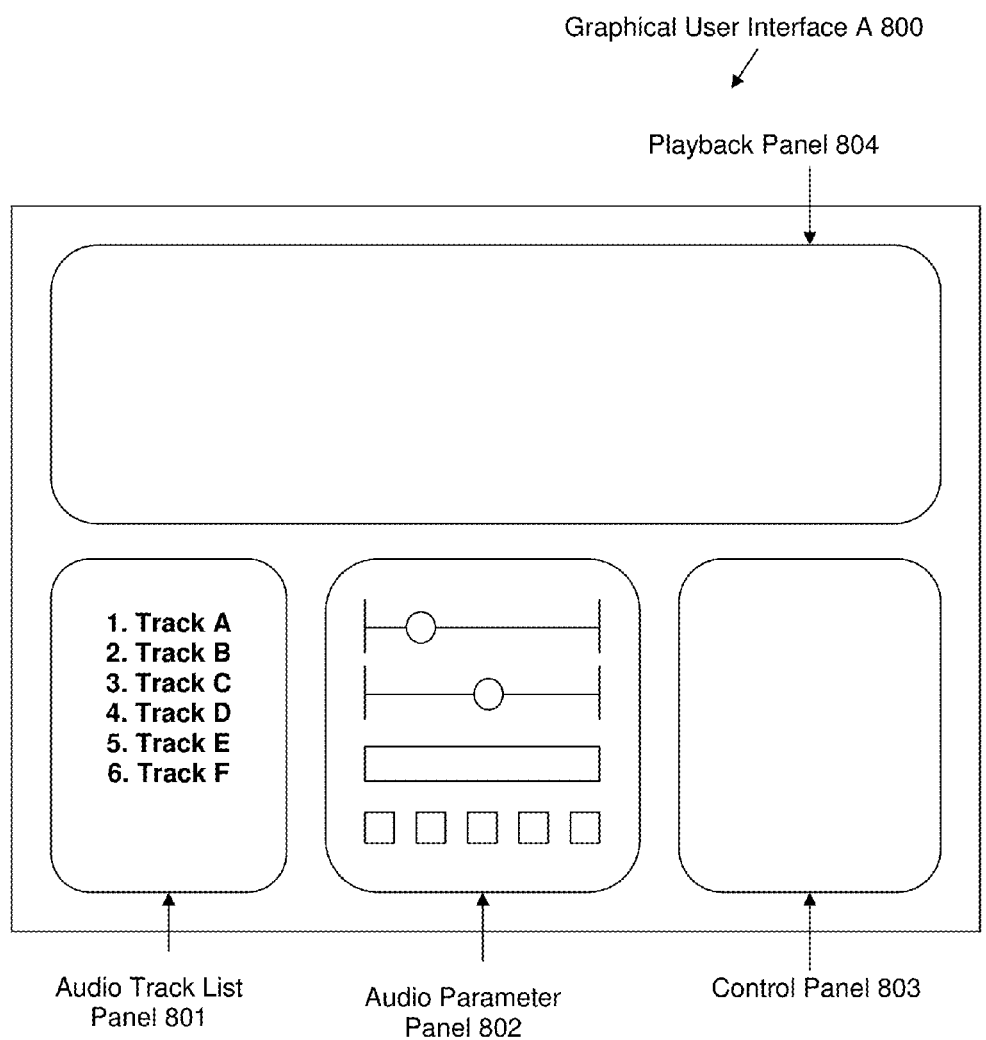
FIG. 8A-8C illustrate examples of graphical user interface of a video application.

In some implementations, audio track component 104A may be configured to determine an audio filter parameter based on user input. User input may be received through the graphical user interface of the video application and/or through other means. For example, FIG. 8A illustrates an example of graphical user interface A 800 of a video player application. Graphical user interface A 800 may include one or more of audio track list panel 801, audio parameter panel 802, control panel 803, playback panel 804, and/or other panels. Individual panels of graphical user interface A 800 may present different information. For example, audio track list panel 801 may present information relating to audio tracks in a repository of audio tracks. Audio parameter panel 802 may present information related to one or more parameters of audio tracks. Control panel 803 may present playback options for playback of one or more video clips accompanied by one or more audio tracks. Playback panel 804 may present playback of one or more versions of video clips. Other appearances and types of graphical user interface/panels are contemplated.

Audio parameter panel 802 may present information related to one or more parameters of audio tracks. For example, audio parameter panel 802 may present information related to one or more audio filter parameters. In some implementations, audio parameter panel 802 may allow a user to determine one or more audio filter parameters.

For example, a user may determine an audio filter parameter by moving a circle on one or both of two sliders in audio parameter panel 802. The location of the circle(s) on the slider(s) may correspond to a certain value of an audio filter parameter. For example, an audio filter parameter may include a user-specified audio filter parameter corresponding to a ranking of audio tracks between one and five. Based on a user's placement of the circle on the slider (e.g., 2), audio tracks having rankings that meet the value specified by the placement of the circle (e.g., 2) may be presented in audio track list panel 801. A user may determine an audio filter parameter by entering information relating to the audio filter parameter (e.g., a tempo, etc.) via a keyboard, a touchscreen, a button, and/or other user-input devices. A user may determine an audio filter parameter by clicking on one or more buttons in audio parameter panel 802 corresponding to one or more audio filter parameters (e.g., a genre, etc.). One or more audio filter parameters may be determined in other ways.

Audio track component 104A may be configured to compare individual audio tracks with an audio filter parameter. For example, based on a user's movement of a circle on a slider for a user-specified audio filter parameter (e.g., ranking of audio tracks, etc.) in audio parameter panel 802, audio track component 104A may compare the value corresponding to the user's placement of the circle on the slider with the individual audio tracks (e.g., ranking of audio tracks, etc.). Audio track component 104A may compare an audio filter parameter (e.g., a tempo, etc.) with the individual audio tracks (e.g., tempo of audio tracks, etc.). Based on a user's clicking a button in audio parameter panel 802 corresponding to an audio filter parameter (e.g., a genre, etc.), audio track component 104A may compare the audio filter parameter selected by the user with the individual audio tracks (e.g., genre of audio tracks, etc.). Other types of comparison of individual audio track with one or more audio filter parameters are contemplated.

Based on the comparison, audio track component 104A may be configured to determine whether the individual audio tracks meet the audio filter parameter. For example, audio track component 104A may determine that an audio track meets an audio filter parameter if the audio track matches the audio filter parameter (e.g., ranking of audio tracks, tempo of audio tracks, genre of audio tracks, etc.). Audio track component 104A may determine that an audio track meets an audio filter parameter if the audio track falls within a range of the audio filter parameter (e.g., ranking of audio tracks is equal to, below, and/or above the ranking audio filter parameter; tempo of audio tracks is equal to, below, and/or above the tempo audio filter parameter; genre of audio tracks is a subgenre of the genre audio filter parameter, etc.).

In some implementations, audio track component 104A may be configured to determine whether the individual audio tracks meet multiple audio filter parameters. For example, audio track component 104A may compare the individual audio tracks with a first audio filter parameter and a second audio filter parameter. Audio track component 104A may require the individual audio tracks to meet both the first audio filter parameter and the second audio filter parameter, either the first audio filter parameter or the second audio filter parameter, or have one audio filter parameter take precedence over the other audio filter parameter.

GUI component 106A may be configured to effectuate presentation of audio tracks on a graphical user interface of a video application. The video application may allow for selection of an audio track by a user to use as accompaniment for a video clip. For example, in FIG. 8A, audio track list panel 801 may present information related to audio tracks in a repository of audio tracks. Information presented may include one or more of a name, a duration, a beat, a tempo, a rhythm, an instrument, a volume, a vocal, a frequency, a style, a genre, a performer, a composer, a lyric, a start, an end, and/or other information related to audio tracks. Audio track list panel 801 may allow a user to select one or more audio tracks listed in audio track list panel 801 to be used as accompaniment for a video clip. One or more selections of audio tracks may be stored in instructions 14 and/or in other locations.

In some implementations, GUI component 106A may be configured to effectuate presentation of the audio tracks that meets the audio filter parameter on the graphical user interface of the video application. For example, GUI component 106A may display in audio track list panel 801 individual audio tracks determined by audio track component 104A to meet one or more audio filter parameters.

GUI component 106A may be configured to effectuate presentation of an audio mixing option on the graphical user interface of the video application. The audio mixing option may be presented on the graphical user interface for selection by the user. The audio mixing option may define volume at which one or more audio tracks are played as accompaniment for the video clip. One or more selections from the audio mixing option may be stored in instructions 14 and/or in other locations.

In some implementations, the audio mixing option may include one or more options to set a percentage of the volume at which one or more audio tracks are played as accompaniment for a video clip. The video clip may include one or more audio, and an inverse relationship may exist between volume at which one or more audio of the video clip are played and the volume at which one or more audio tracks are played. For example, a hundred percent of the volume for an audio track may correspond to a zero percent of the volume for an audio of the video clip. A zero percent of volume for an audio track may correspond to a hundred percent of volume for an audio of the video clip. A fifty percent of volume for an audio track may correspond to a fifty percent of volume for an audio of the video clip.

In some implementations, the audio mixing option may include one or more option to decrease the volume at which one or more audio tracks are played at one or more moments in the video clip corresponding to one or more moments of interest. The video clip may include one or more audio, and an inverse relationship exists between volume at which one or more audio of the video clip are played and the volume at which one or more audio tracks are played. A moment in the video clip corresponding to a moment of interest may include a first duration of time before a point in time corresponding to the moment of interest. A moment in the video clip corresponding to a moment of interest may include a second duration of time after the point in time corresponding to the moment of interest.

Figure 9:
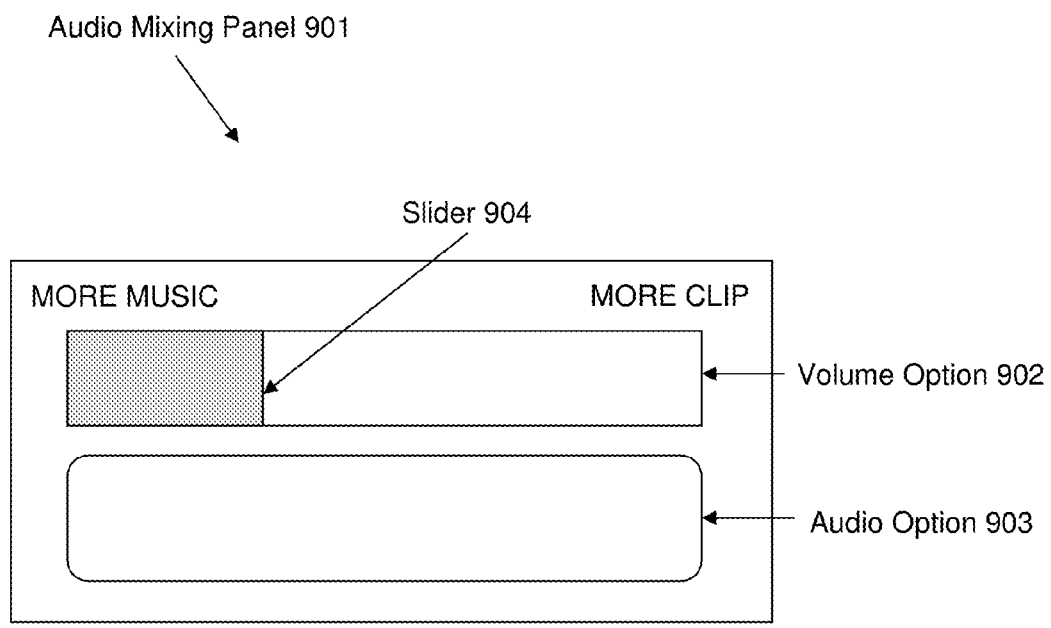
FIG. 9 illustrates an example of an audio mixing panel on a graphical user interface of a video application.

FIG. 9 illustrates a non-limiting example of audio mixing panel 901 on a graphical user interface of a video application. Audio mixing panel 901 may include volume option 902, audio option 903, and/or other options. Volume option 902 may include slider 904 that allows a determination of what percentage of audio from an audio track may be played and what percentage of audio from a video clip may be played. For example, setting slider 904 to the left side may result in a hundred percent of volume for an audio track and zero percent of volume for an audio of the video clip to be played on playback. Setting slider 904 to the right side may result in zero percent of volume for an audio track and a hundred percent of volume for an audio of the video clip to be played on playback. Setting slider 904 in between the left side and the right side may result in a certain percent of volume (e.g., 70%, etc.) for an audio track and an inverse percent of volume (e.g., 30%, etc.) for an audio of the video clip to be played on playback. Audio mixing panel 901 may include one or more fields in which a user may enter one or more values to control the volume for an audio track and/or an audio of the video clip.

Audio mixing panel 901 may include one or more options (e.g., in audio option 903, etc.) to decrease the volume at which one or more audio tracks are played at one or more moments in the video clip corresponding to one or more moments of interest. For example, audio option 903 may include a toggle that allows a user to enable decrease in volume of an audio track at one or more moments and increase in volume of an audio of the video clip at one or more moments. For example, audio option 903 may allow the audio of the video clip to be toggled off. Toggling such an option may change a playback of the video clip so that the audio track fades out and the audio of the video clip fades in as the playback approaches a moment of interest/a point in time corresponding to a moment of interest. The audio track may fade back in and the audio of the video clip may fade back out after the playback passes the moment of interest/the point in time corresponding to the moment of interest. Such a playback of the audio track and the audio of the video clip may result in a momentary fade of the audio track and louder playback of audio of the video clip around the moment of interest.

For example, instructions 14 may define a playback of video clip such that the playback starts with a hundred percent of volume for an audio track and zero percent of volume for an audio of the video clip. A certain time (e.g., 3 seconds, etc.) before a point in time corresponding to a moment of interest, the volume for the audio track may be decreased and the volume for the audio of the video clip may be increased (e.g., gradually, etc.) so that the audio track is played at a zero percent and the audio of the video clip is played at a hundred percent at the point in time corresponding to the moment of interest. A certain time (e.g., 3 seconds, etc.) after the point in time corresponding to the moment of interest, the volume for the audio track may be increased and the volume for the audio of the video clip may be decreased (e.g., gradually, etc.) so that the audio track is played at a hundred percent and the audio of the video clip is played at zero percent after the point in time corresponding to the moment of interest. The percentage of volume for the audio track and the audio of the video clip may be restored to the original percentage or to a different percentage.

The duration during which the volume is increased/decreased may be determined based on user input. For example, audio option 903 may include one or more sliders that allows a user to select the duration which the volume is increased/decreased by moving the slider(s) from one side to another. Audio option 903 may include one or more fields in which a user may enter one or more values to set the duration during which the volume is increased/decreased.

The increase in the volume of the audio of the video clip and decrease in the volume of the audio track may be maintained for a duration surrounding the point in time corresponding to the moment of interest. For example, the audio track may be played at a zero percent and the audio of the video clip may be played at a hundred percent for 0.5 seconds. The duration during which the increase/decrease in volume is maintained may be centered at the point in time corresponding to the moment of interest (e.g., 0.25 seconds before and 0.25 seconds after the point in time corresponding to the moment of interest, etc.) or may not be centered at the point in time corresponding to the moment of interest (e.g., 0.2 seconds before and 0.3 seconds after the point in time corresponding to the moment of interest, etc.).

The duration during which the increase/decrease in volume is maintained may be determined based on user input. For example, audio option 903 may include one or more sliders that allows a user to select the duration which the increase/decrease in volume is maintained by moving the slider(s) from one side to another. Audio option 903 may include one or more fields in which a user may enter one or more values to set the duration during which the increase/decrease in volume is maintained. The duration during which the increase/decrease in volume is maintained may be centered at the point in time corresponding to the moment of interest. The centering of the duration during which the increase/decrease in volume is maintained may be changed by a user.

Audio mixing panel 901 may be a part of graphical user interface A 800, graphic user interface B 810, graphical user interface C 820, and/or other graphical user interface. Audio mixing panel 901 may be separate from other panels within graphical user interface A 800, graphic user interface B 810, graphical user interface C 820, and/or other graphical user interface or may form a part of one or more of panels within graphical user interface A 800, graphic user interface B 810, graphical user interface C 820, and/or other graphical user interface. Audio mixing panel 901 may be static or dynamic. For example, audio mixing panel 901 may be a part of graphical user interface A 800 that is shown when graphical user interface A 800 is in view. Audio mixing panel 901 may appear or disappear based on one or more operations. For example, audio mixing panel 901 may appear (e.g., as a floating panel, etc.) when one or more audio tracks listed in audio track list panel 801 is selected. Audio mixing panel 901 may disappear when a user clicks on other parts of graphical user interface A 800 (e.g., control panel 803, etc.).

Revised instruction component 108A may be configured to determine revised instructions defining one or more revised versions of the video clip that are synchronized with one or more audio tracks. A revised version of the video clip may be synchronized so that one or more moments within the video clip corresponding to one or more occurrences of video events are aligned with one or more moments within an audio track corresponding to one or more audio event markers. The revised instructions may include information relating to one or more selections of audio track and/or the audio mixing option.

In some implementations, revised instruction component 108A may determine revised instructions for one or more audio tracks presented on the graphical user interface of the video application. In some implementations, revised instruction component 108A may determine revised instructions for one or some of the audio tracks presented on the graphical user interface of the video application. In some implementations, revised instruction component 108A may determine revised instructions for all of the audio tracks presented on the graphical user interface of the video application. In some implementations, revised instruction component 108A may determine revised instructions for one or more audio tracks presented on the graphical user interface of the video application in response to a user's selection of the one or more audio tracks.

Figure 7A:
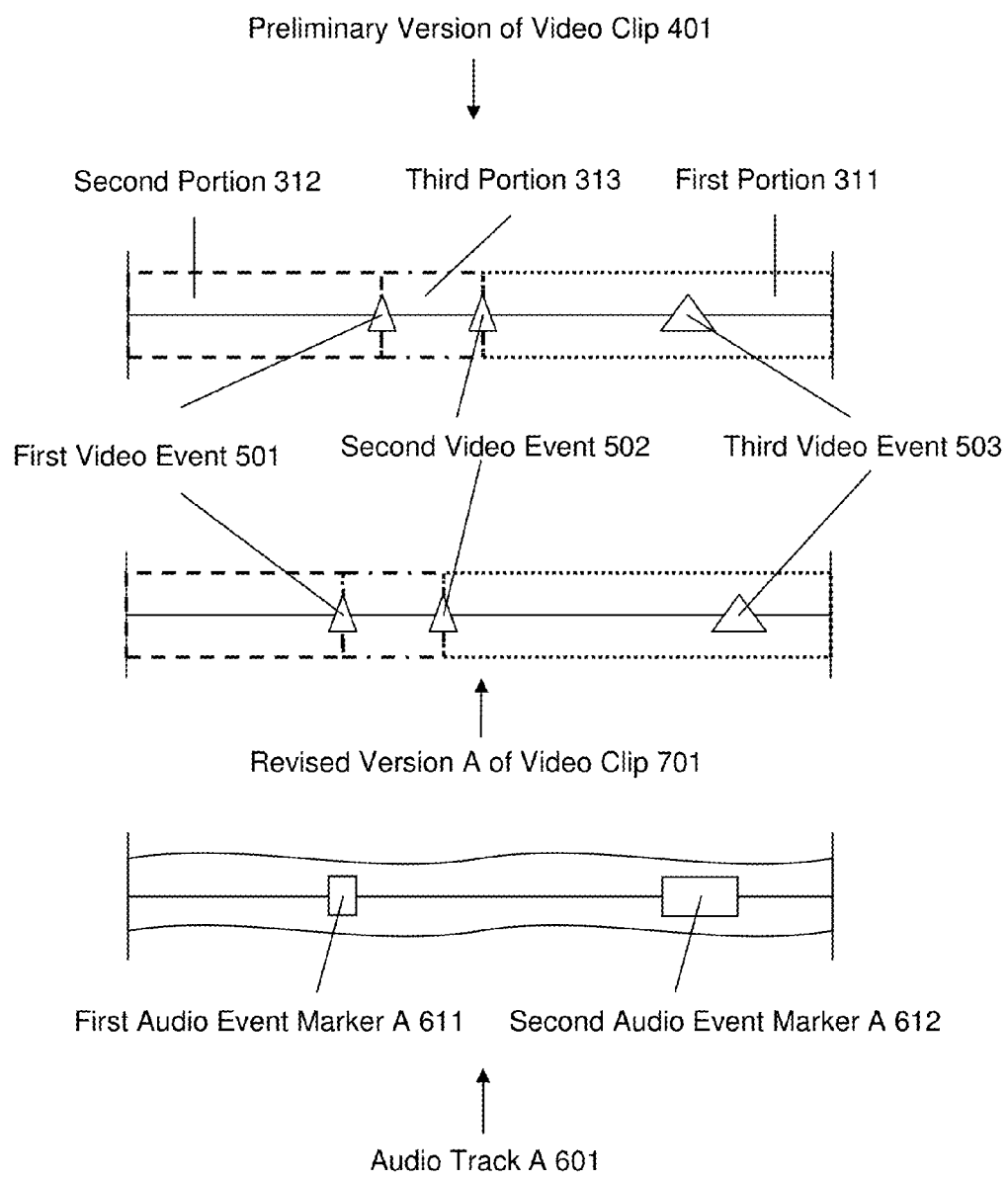
FIG. 7A illustrates an example of a preliminary version of a video clip, an audio track, and a revised version of the video clip.

FIG. 7A illustrates a non-limiting example of preliminary version of video clip 401, audio track A 601, and revised version A of video clip 701. Preliminary version of video clip 401 may be defined by initial instructions. Revised instruction component 108A may determine revised instructions defining revised version A of video clip 701. Revised version A of video clip 701 may be synchronized with audio track A 601.

For example, second portion 312 in preliminary version of video clip 401 may be shortened so that the end of the section portion 312 (indicated by first video event 501) in revised version A of video clip 701 occurs with first audio event marker A 611. Third portion 313 in preliminary version of video clip 401 may be moved so that it follows the shorted second portion 312 in revised version A of video clip 701. A part of first portion 311 in preliminary version of video clip 401 may be lengthened so that the peak of third video event 503 in the revised version A of video clip 701 occurs at the end of second audio event marker A 612. Third portion 313 may not be modified or modified. For example, third portion 313 may be modified so that second video event 502 occurs with another audio event marker (not shown). Third portion 313 may not be modified and second video event 502 may not occur with an audio event marker. For example, a video clip may include three video events and an audio track may include two audio event markers. The video clip may be synchronized with the audio track so that one or two video events occur with one or two audio event markers. In some implementations, a video clip may be synchronized with an audio track so that every video event occurs with an audio event marker. In some implementations, a video clip may be synchronized with an audio track so that every audio event marker occurs with a video event. Other changes in initial instructions to determine revised instructions synchronizing a video clip with an audio track are contemplated.

In some implementations, determining revised instructions may include changing the initial instructions to include one or more of a video timing effect, a video fading effect, and/or other video effects. A video timing effect may refer to a change in length and/or speed of a video clip. A change in length and/or speed of a video clip may be local (specific to a part of a video clip) or global (applicable to the entire video clip). As non-limiting examples, a video timing effect may include one or more of a slow motion effect, a fast motion effect, a time freeze effect, and/or other video timing effects. A slow motion effect may decrease the speed with which a video clip (or a part of the video clip) is presented during playback. A fast motion effect may increase the speed with which a video clip (or a part of the video clip) is presented during playback. A slow motion effect and/or a fast motion effect may be linear or dynamic. A time freeze effect may, for a duration of time, freeze the video clip (or a part of the video clip).

One or more video timing effects may be used to change the video around and/or at one or more moments of interest in a video clip. For example, video around one or more moments of interest may be sped up and/or sped down. One or more frames corresponding to one or more moments of interest may be frozen for a duration. In some implementations, the video around and/or at one or more moments of interest in a video clip may be changed by using systems and/or methods described in U.S. patent application Ser. No. 14/609,227, entitled "APPLYING A SPEED RAMP TO A HIGHLIGHT POINT IN A VIDEO," filed Jan. 29, 2015, the foregoing being incorporated herein by reference in its entirety.

For example, at a certain time before a point in time corresponding to a moment of interest, the speed with which the video clip is played may be increased (e.g. gradually, etc.) so that the playback of the video clip speeds up as it approaches the moment of interest. At a certain time before a point in time corresponding to a moment of interest, the speed with which the video clip is played may be decreased (e.g. gradually, etc.) so that the playback of the video clip slows down as it approaches the moment of interest. The frame corresponding to the moment may interest may be played for a duration and may simulate the video clip being frozen for the duration at the moment of interest during the playback. Following the moment of interest, the speed with which the video clip is played may be increased gradually to restore the original playback speed of the video clip. Following the moment of interest, the speed with which the video clip is played may be ramped up faster than the original playback speed and gradually decreased to restore the original playback speed of the video clip. The duration during which the frame corresponding to the moment of interest may be played and/or the duration during which the speed of the video clip may be changed may be determined based on user input. For example, a user may move one or more sliders corresponding to the duration(s) of interest and or enter one or more values in one or more fields corresponding to the duration(s) of interest.

A video fading effect may refer to a change in a visual of a video clip into another visual. A video fading effect may change a visual of a part of a video clip into another visual of another part of the video clip. A video fading effect may change a visual of a video clip into a static visual (e.g., a black screen, an image, etc.) and/or change a static visual into a visual of a video clip. As non-limiting examples, a video fading effect may include one or more of a fade-in effect, a fade-out effect, and/or other video fading effects. A fade-in effect may allow a visual of a video clip to be presented by changing from another visual into the visual. A fade-out effect may allow a visual of a video clip to end its presentation by changing the visual into another visual.

Figure 7B:
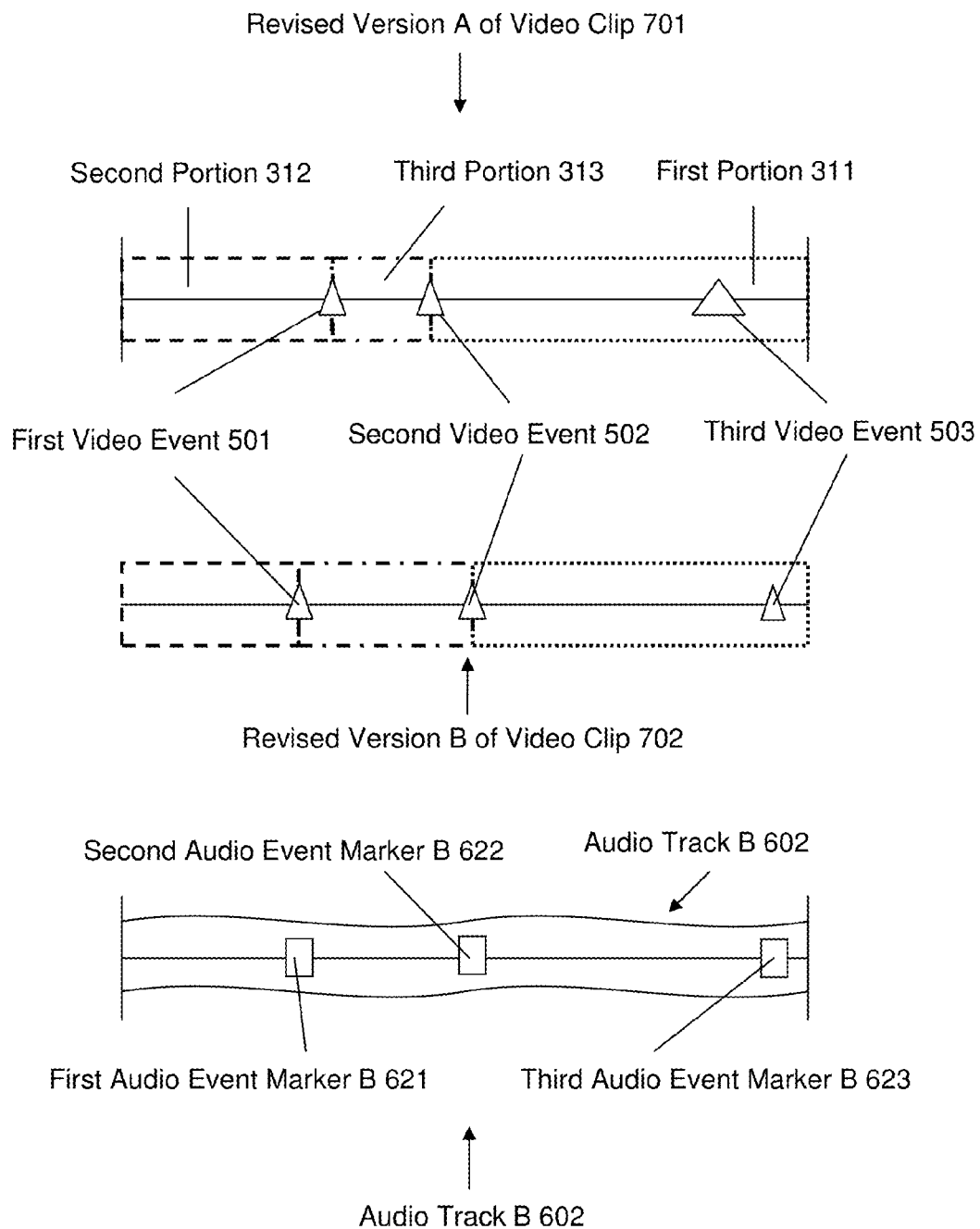
FIG. 7B illustrates an example of changing a revised version of a video clip based on changes to audio track.
Figure 7C:
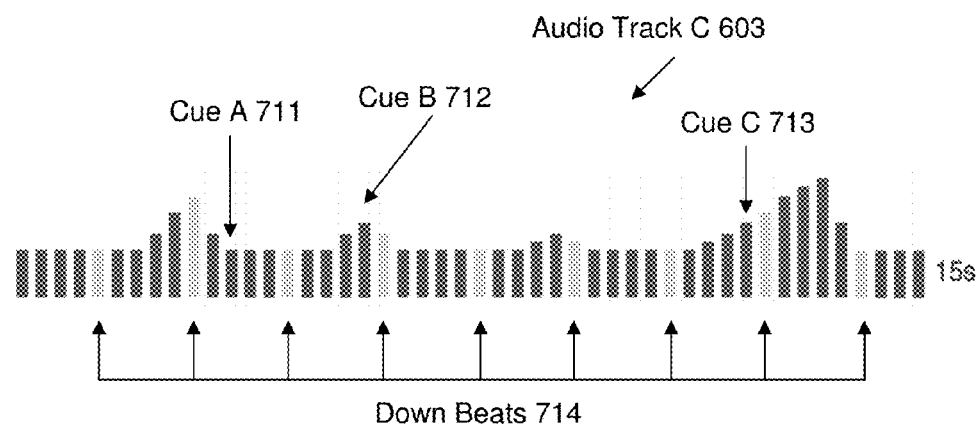
FIG. 7C illustrates an example of an audio track.
Figure 7D:
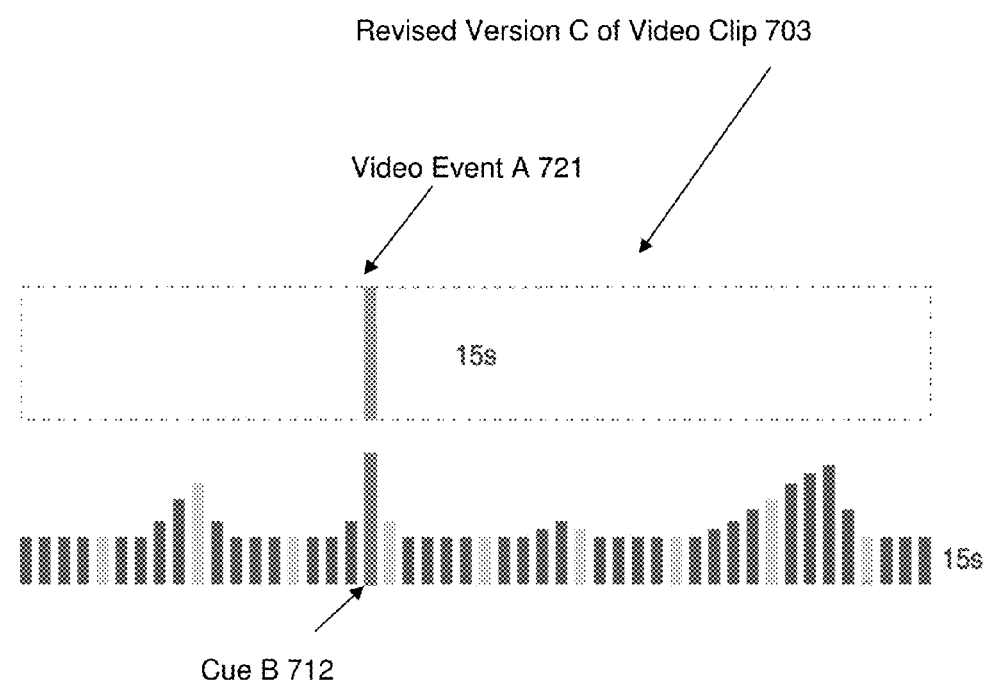
FIGS. 7D-7F illustrate examples of revised versions of video clips.
Figure 7E:
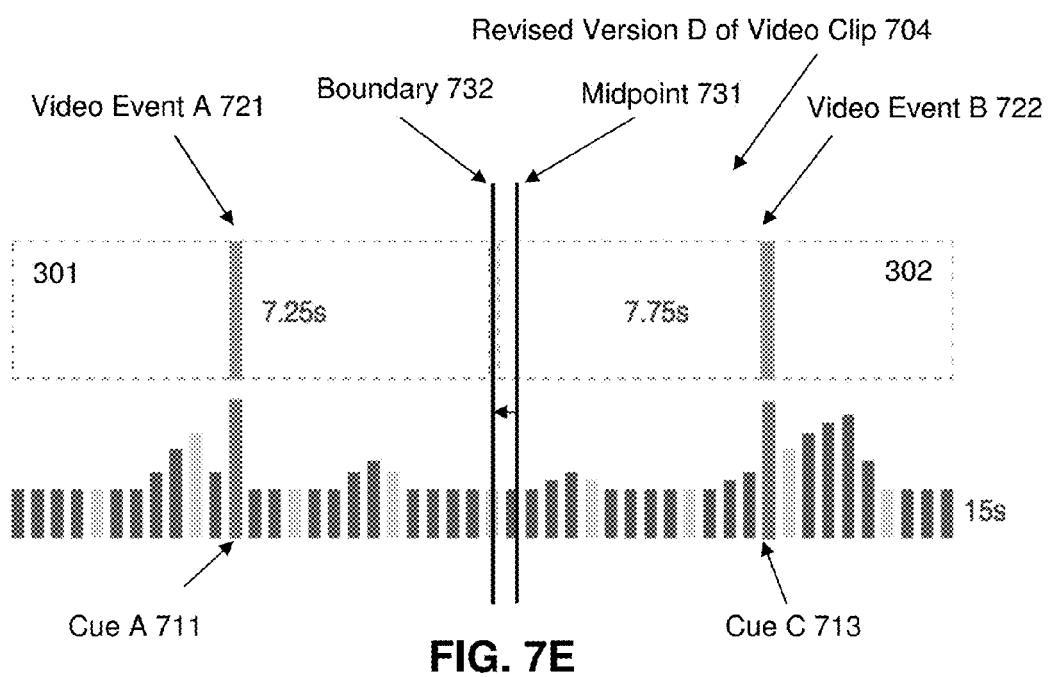
Figure 7F:
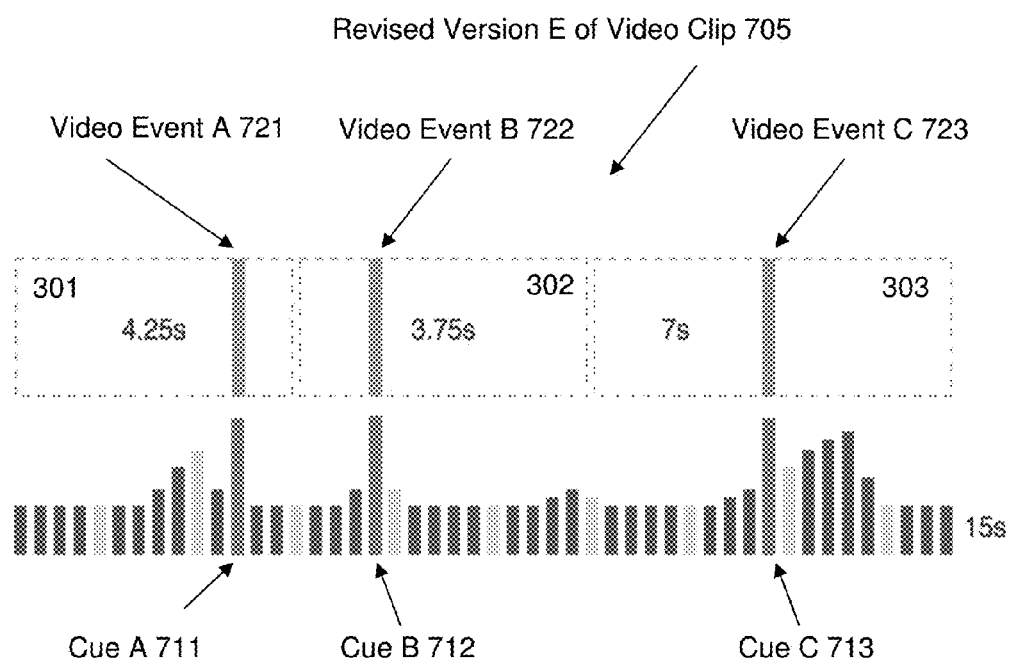

FIGS. 7D-7F illustrates examples of revised versions of video clips. Revised versions of video clips shown in FIGS. 7D-7F may be synchronized to one or more audio tracks, such as audio track C 603 shown in FIG. 7C. Audio track C 603 may include one audio track or a combination of multiple audio tracks. Audio track C 603 may have a duration of 15 seconds. Other durations (e.g., 8 seconds, 30 seconds, 45 seconds, 60 seconds, etc.) are contemplated.

Audio track C 603 may include down beats 714, cue A 711, cue B 712, and cue C 713. Down beats 714 may be identified by a user or through analysis of audio track C 603. Cue A 711, cue B 712, and/or cue C 713 may be pre-selected by a user, dynamically selected by a user, or identified through analysis of audio track C 603. Audio track C 603 may include audio event markers corresponding to down beats 714, cue A 711, cue B 712, and/or cue C 713. In some implementations, down beats 714, cue A 711, cue B 712, and/or cue C 713 may be audio event markers.

Revised versions of video clips may be synchronized with audio tracks so that one or more moments within video clips corresponding to one or more occurrences of video events (e.g., a moment of interest, etc.) are aligned with one or more cues. Synchronization of video events with cues may differ based on whether the cues are ranked or not ranked. For example, cue A 711, cue B 712, cue C 713 may not be ranked. Video events within video clips may be synchronized based on the order (or the reverse order) in which cues appears in audio track 603. For example, a video clip may include three moments of interest. The first moment of interest may be aligned with cue A 711 (or cue C 713), the second moment of interest may be aligned with cue B 712, and the third moment of interest may be aligned with cue C 713 (or cue C 713). Other alignments of video events to non-ranked audio event markers are contemplated.

Cue A 711, cue B 712, cue C 713 may be ranked. For example, cue B 712 may be ranked first, cue A 711 may be ranked second, and cue C 713 may be ranked third. Other rankings of cues are contemplated. Video events within video clips may be synchronized based on the ranking (or reverse ranking) of cues in audio track 603. For example, the first moment of interest may be aligned with cue B 712 (or cue C 713), the second moment of interest may be aligned with cue A 711, and the third moment of interest may be aligned with cue C 713 (or cue B 712). Other alignments of video events to ranked audio event markers are contemplated.

Alignment of video events/video clips to audio event markers may be changed. For example, a user may rearrange alignments of video events and/or video clips to audio event markers using a storyboard function of a graphical user interface. (e.g., using a storyboard to drag a given moment of interest/given video clip to a certain cue).

Durations of video(s)/segment(s) of video(s) within a version of a video clip may be determined based on alignment of video events to audio event markers. FIG. 7D illustrates revised version C of video clip 703. Revised version C of video clip 703 may be synchronized with audio track C 603 so that one or more moments within video clip(s) corresponding to one or more occurrences of video events are aligned with one or more moments within audio track C 603 corresponding to one or more audio event markers. For example, video clip(s) in revised version C of video clip 703 may include video event A 721 (e.g., a moment of interest, etc.). Video event A 721 may be aligned to cue B 712. Cue B 712 may occur 5 seconds within audio track C. Video clip(s) in revised version C of video clip 703 may be used to fill the duration of audio before and after cue B 712. For example, revised version C of video clip 703 may include 5 seconds of video clip(s) preceding cue B 712 and 10 seconds of video clip(s) following cue B 712.

One or more portions of video clip(s) in revised version C of video clip 703 may be associated one or more of a video timing effect, a video fading effect, and/or other video effects. For example, 5 seconds of video clip(s) preceding cue B 712 may be associated with a video timing effect to change the speed of playback of the 5 seconds of video clip(s) or one or more portions of the 5 seconds of video clip(s) (e.g., increasing playback speed so that 5 seconds of video duration includes more than 5 seconds of video capture, reducing playback speed so that 5 seconds of video duration includes less than 5 seconds of video capture, etc.).

Durations of video(s)/segment(s) of video(s) within a version of a video clip may be determined based on other audio event markers or other audio characteristics. FIG. 7E illustrates revised version D of video clip 704. Revised version D of video clip 704 may be synchronized with audio track C 603 so that one or more moments within video clip(s) corresponding to one or more occurrences of video events are aligned with one or more moments within audio track C 603 corresponding to one or more audio event markers. For example, video clip(s) in revised version D of video clip 704 may include video event A 721 and video event B 722. Video event A 721 and video event B 722 may be located within a single contiguous video clip or multiple video clips. For example, video event A 721 may be included in first video clip 301 and video event B 722 may be included in second video clip 302. First video clip 301 and second video clip 302 may be captured by the same video capture device, different video capture devices, processed by the same video application, processed by separate video applications, captured at the same time, or captured at different times.

In FIG. 7E, video event A 721 may be aligned to cue A 711, and video event B 722 may be aligned to cue C 713. Other alignments of video events to cues are contemplated. Durations of video surrounding video event A 721 and video event B 722 may be determined based on alignment of video event A 721 and video event B 722 to cue A 711 and cue C 713, respectively, and other audio event markers or other audio characteristics (e.g., based on down beats 714). For example, video event A 721 may be included in first video clip 301 and video event B 722 may be included in second video clip 302. Boundary 732 between video clip 301 and second video clip 302 may be determined by finding a mid-point between video event A 721 and video event B 722 (e.g., midpoint 731), and shifting to the nearest beat (e.g., nearest down beat 714, etc.). In FIG. 7E, the nearest down beat 714 may be located 0.25 seconds before midpoint 731. Boundary 732 may be determined at a point in time 0.25 seconds before midpoint 731. Such a determination of boundary 732 may result in first video clip 301 contributing 7.25 seconds and second video clip 302 contributing 7.75 seconds to revised version D of video clip 704.

Revised version D of video clip 704 may be synchronized based on selection of a video clip containing video event A 721 and video event B 722 or based on addition of video clips to previously synchronized video clips. For example, an edited video clip may contain two separate video clips (one containing video event A 721, the other containing video event B 722). The edited video clip may be synchronized to audio track so that video event A 721 and video event B 722 are aligned to audio event markers. A video clip containing video event A 721 may be synchronized to audio track so that video event A 721 is aligned to an audio event marker. Another video clip containing video event B 722 may be added for synchronization (e.g., using a storyboard function, etc.) so that video event B 722 is aligned to an audio event marker. Addition of the other video clip may change synchronization of the original video clip (e.g., from Revised version C of video clip 703 to revised version D of video clip 704, etc.).

FIG. 7F illustrates revised version E of video clip 705. Revised version E of video clip 705 may be synchronized with audio track C 603 so that one or more moments within video clip(s) corresponding to one or more occurrences of video events are aligned with one or more moments within audio track C 603 corresponding to one or more audio event markers. For example, video clip(s) in revised version E of video clip 705 may include video event A 721, video event B 722, and video event C 723. Video event A 721, video event B 722, and video event C 723 may be located within a single contiguous video clip or multiple video clips. For example, video event A 721 may be included in first video clip 301, video event B 722 may be included in second video clip 302, and video event C 723 may be included in other video clip 303.

In FIG. 7F, video event A 721 may be aligned to cue A 711, video event B 722 may be aligned to cue B 712, and video event C 723 may be aligned to cue C 713. Other alignments of video events to cues are contemplated. Boundary between first video clip 301 and second video clip 302 may be determined by finding a mid-point between video event A 721 and video event B 722, and shifting to the nearest beat (e.g., shifting down to the nearest beat, etc.). Boundary between second video clip 302 and other video clip 303 may be determined by finding a mid-point between video event B 722 and video event C 723, and shifting to the nearest beat (e.g., shifting up to the nearest beat, etc.). Such determinations of boundaries may result in first video clip 301 contributing 4.25 seconds, second video clip 302 contributing 3.75 seconds, and other video clip 303 contributing 7 seconds to revised version E of video clip 705.

Revised instruction component 108A may be configured to determine one or more changes to one or more audio tracks to which a video clip is synchronized. A change to an audio track may include one or more of a change to a duration of the audio track, a change in a tempo of the audio track, a change in one or more of the audio event markers, a selection of a different audio track, a change in a moment at which synchronization begins, a change in a moment at which synchronization ends, and/or other changes to the audio track. For example, a user may make one or more changes to an audio track via a graphical user interface of a video application (e.g., graphical user interface shown in FIGS. 8A-8C, etc.). Revised instruction component 108A may determine the changes made by the user via the graphical user interface.

In some implementations, an audio track may include a first audio and a change to the audio track may include one or more of adding a second audio to the audio track, removing the first audio from the audio track, and/or other changes to the audio track. The second audio may be added to the audio track on top of the first audio (e.g., at least a portion of first audio and second audio overlap so both are heard together, etc.), before the first audio, or after the first audio. For example, an audio track may include a song and a change may include adding another song, a voice recording, and/or other audio to the audio track. The added audio may be added on top of the song, before the song, or after the song. An audio track may include a voice recording and a change may include removing the voice recording from the audio track. One or more portions or the entire voice recording may be removed from the audio track. An audio track may include a song and a change may include removing the song from the audio track and adding a different song to the audio track. Such a change may effectuate a replacement of the song with the different song in the audio track.

Revised instruction component 108A may be configured to determine second revised instructions defining a second revised version of the video clip that is synchronized with the changed audio track. The second revised version of the video clip may be synchronized so that one or more moments within the video clip corresponding to one or more occurrences of video events are aligned with one or more moments within the changed audio track corresponding to one or more audio event markers.

For example, FIG. 7B illustrates a non-limiting example of revised version A of video clip 701, audio track B 602, and revised version B of video clip 702. Revised version A of video clip 701 may be defined by revised instructions discussed above. Revised version A of video clip 701 may be synchronized to audio track A 601 (shown in FIG. 7A). Revised instruction component 108A may determine one or more changes from synchronization based on audio track A 601 to audio track B 602. Audio track B 602 may be a different audio track than audio track A 601 (e.g., a user selected a different audio track for a video clip, etc.) or may be modified audio track A 601 (e.g., a user modified audio track A 601 to audio track B 602, etc.). Revised instruction component 108A may determine second revised instructions defining revised version B of video clip 702. Revised version B of video clip 702 may be synchronized with audio track B 602.

For example, second portion 312 in revised version A of video clip 701 may be shortened so that the end of section portion 312 (indicated by first video event 501) in revised version B of video clip 702 occurs with first audio event marker B 621. Third portion 313 in revised version A of video clip 701 may be moved and lengthened so that it follows the shorted second portion 312 in revised version B of video clip 702 and the end of third portion 313 (indicated by second video event 502) in revised version B of video clip 702 occurs with second audio event marker B 622. First portion 311 in revised version A of video clip 701 may be shortened by speeding up a part of the video associated with third video event 503, and third video event 503 may occur with third audio event marker B 623. Other changes in revised instructions to determine second revised instructions synchronizing a video clip with a changed audio track are contemplated.

Figure 8B:
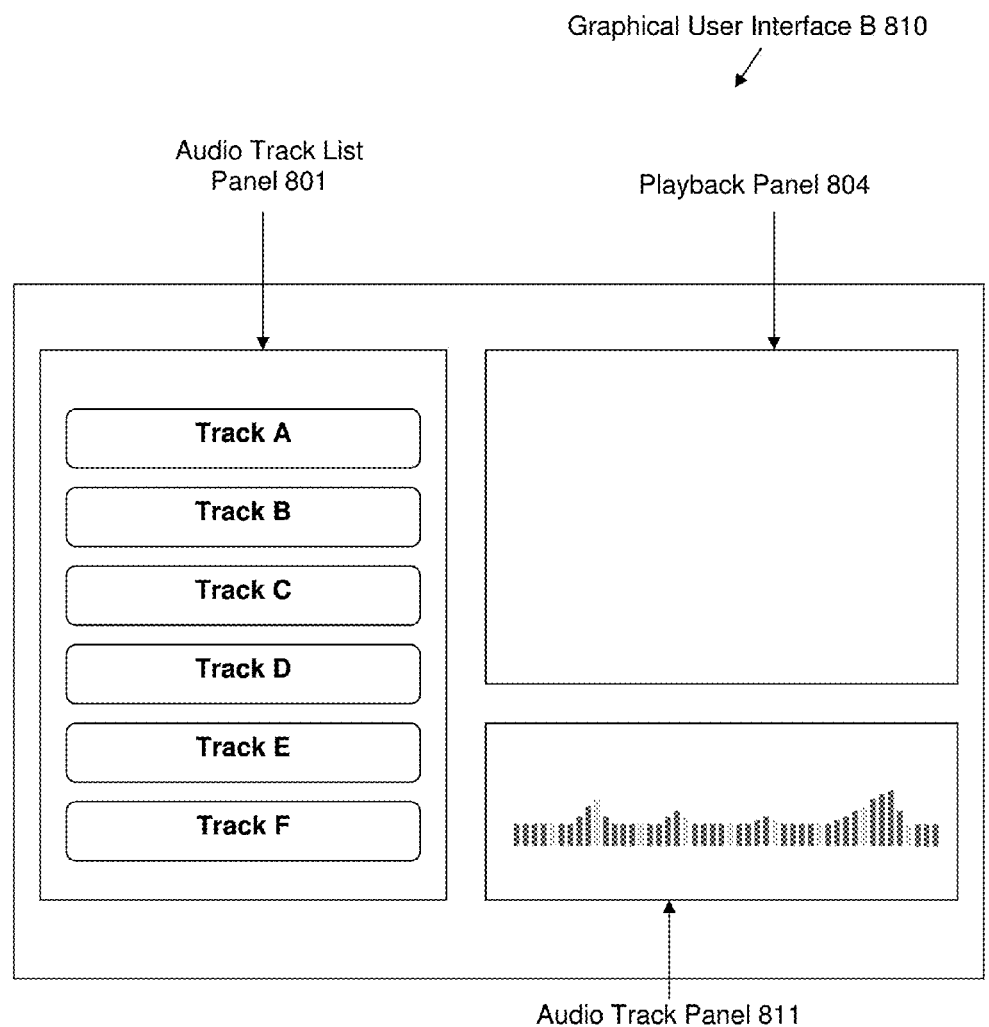

FIG. 8B illustrates a non-limiting example of graphical user interface B 810. Graphical user interface B 810 may be used to select and/or change one or more audio tracks for video clips/video presentations. Graphical user interface B 810 may include one or more of audio track list panel 801, playback panel 804, audio track panel 811, and/or other panels. Other appearances and types of graphical user interface/panels are contemplated.

Individual panels of graphical user interface B 810 may present different information. Playback panel 804 may present playback of one or more versions of video clips. Audio track list panel 801 may present information relating to audio tracks in a repository of audio tracks. For example, audio track list panel 801 may present information relating to titles, durations, audio event markers (e.g., location, length, type, etc.), audio filter parameters (e.g., style, user-specified audio filter parameter, etc.), and/or other information relating to audio tracks. Audio track list panel 801 may present audio tracks in one or more groups (e.g., a group of accessible audio tracks, a group of premium audio tracks that require subscription for access, recently added audio tracks, recently used audio tracks, etc.). Audio track list panel 801 may allow a user to select one or more audio tracks.

Audio track panel 811 may present information about a selected audio track. For example, in response to selection of Track A in audio track list panel 801, audio track panel 811 may present information about Track A. For example, audio track panel 811 may present information relating to title, duration, audio event markers (e.g., location, length, type, etc.), audio filter parameters (e.g., style, user-specified audio filter parameter, etc.), and/or other information relating to selected audio tracks. A selected audio track information presented in audio track panel 811 may be more detailed than information presented in audio track list panel 801. For example, audio track panel 811 may provide graphical views of changes in a selected audio track over time that may be more detailed than shown in audio track list panel 801. Audio track panel 811 may provide graphical views of audio event markers in a selected audio track that that may be more detailed than shown in audio track list panel 801. In some implementations, audio track panel 811 may allow a user to make changes to a selected audio track.

Playback component 110A may be configured to, responsive to a user's selection of an audio track, effectuate playback of a video clip along with the audio track as accompaniment. The audio track may be played at the volume defined by the user selection of the audio mixing option.

A user may be presented with playback of the video clip through the graphical user interface of the video application. For example, playback panel 804 may present playback of the revised version of the video clip. Control panel 803 may present playback options for playback of one or more video clips accompanied by one or more audio tracks. Playback options may include one or more options to control the playback of one or more video clips by the video application. As non-limiting examples, playback options may include one or more start, stop, pause, fast forward, rewind, next, previous, slow play, fast play, zoom in, zoom out, increase volume, decrease volume, mute, and/or other playback options. In some implementations, playback options may include one or more options to change one or more video clips and/or one or more audio tracks. Other types of playback options are contemplated.

One or more components of systems and/or methodologies described herein may be used to generate one or more types of video presentations. A video presentation may refer to media content that may be presented visually. A video presentation may include one media content and/or multiple media content that may be presented visually. For example, a video presentation may include one or more of a video compilation, a video summary, a video clip, an image, and/or other video presentations.

A storyboard function of a video application may facilitate generation a video presentation using video clips, and/or other information. In some implementations, generation of a video presentation through a storyboard function may be accomplished using systems and/or methods described in U.S. patent application Ser. No. 14/918,338, entitled "SYSTEM AND METHOD OF PROVIDING RECOMMENDATIONS OF MOMENTS OF INTEREST WITHIN VIDEO CLIPS POST CAPTURE," filed Oct. 20, 2015, and/or U.S. patent application Ser. No. 14/918,321, entitled "SYSTEM AND METHOD OF GENERATING VIDEO FROM VIDEO CLIPS BASED ON MOMENTS OF INTEREST WITHIN THE VIDEO CLIPS," filed Oct. 20, 2015, incorporated supra.

Figure 8C:
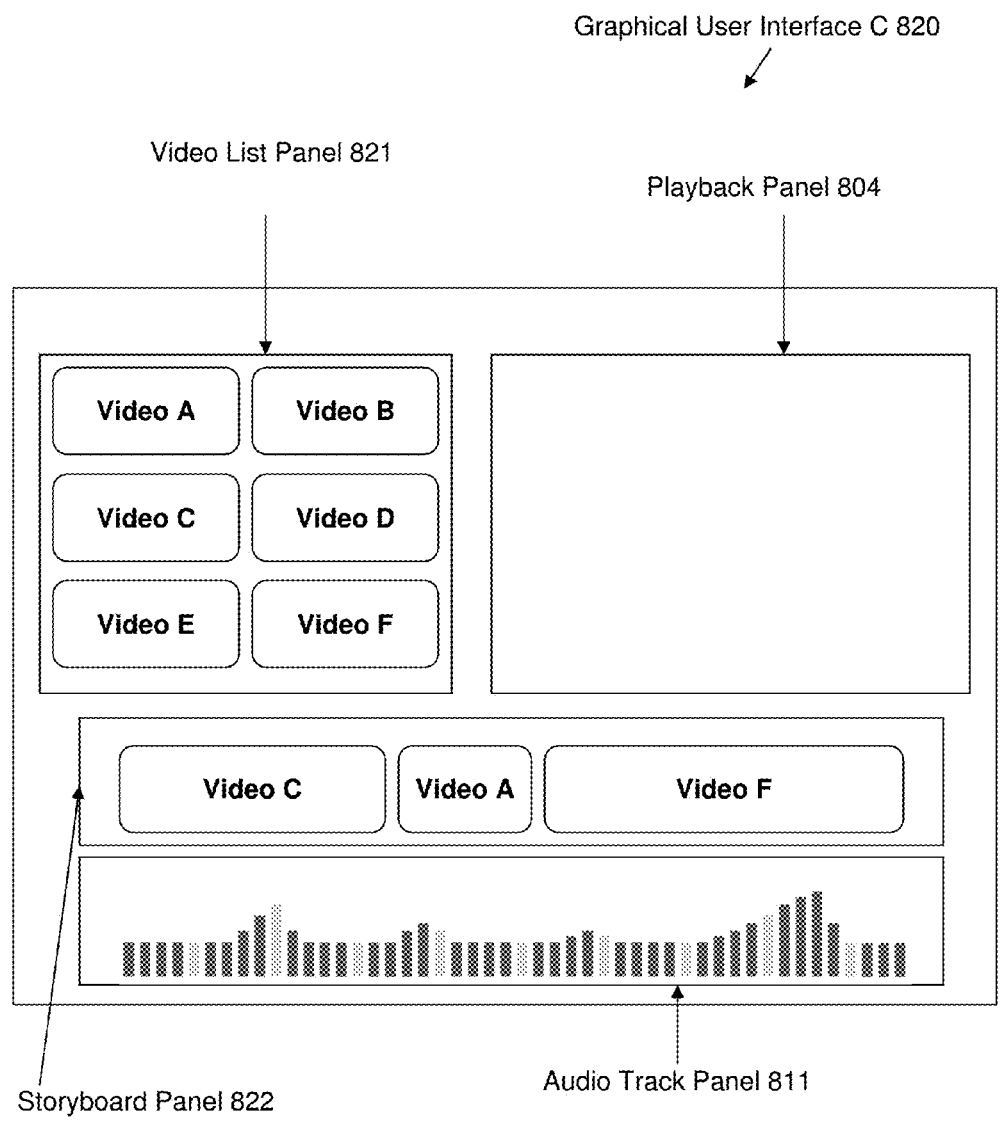

FIG. 8C illustrates a non-limiting example of graphical user interface C 820. Graphical user interface C 820 may be used to select and/or change one or more video clips to generate a video presentation. Graphical user interface C 820 may include one or more of playback panel 804, audio track panel 811, video list panel 821, storyboard panel 822, and/or other panels. Other appearances and types of graphical user interface/panels are contemplated.

Individual panels of graphical user interface C 820 may present different information. Playback panel 804 may present playback of one or more versions of a video presentation. Audio track panel 811 may present information about one or more audio tracks selected and/or changed for the one or more versions of a video presentation. Audio track panel 811 may present information about synchronization between one or more videos and one or more audio tracks. For example, audio track panel 811 may present information about synchronization between one or more audio event markers and one or more video events. In some implementations, audio track panel 811 may allow a user to make changes to one or more audio tracks.

Video list panel 821 may present one or more visual media content in video content 13 and/or other visual media content. For example, video list panel 821 may present one or more of first video clip 301, second video clip 302, other video clip 303, and/or other visual media content. Video list panel 821 may present information relating to visual media content. For example, video list panel 821 may present information relating to titles, durations, dates, video events (e.g., location, length, type, etc.), and/or other information relating to visual media content. Video list panel 821 may allow a user to select one or more visual media content for inclusion in one or more versions of a video presentation.

Storyboard panel 822 may present one or more visual media content included in one or more versions of a video presentation. Storyboard panel 822 may present information about one or more included visual media content. For example, storyboard panel 822 may present information relating to titles, durations, dates, video events (e.g., location, length, type, etc.), and/or other information relating to included visual media content. Information about visual media content presented in storyboard panel 822 may be more detailed than information about visual media content presented in video list panel 821. For example, storyboard panel 822 may provide graphical views of video events and/or synchronization between one or more video events and audio event markers. In some implementations, storyboard panel 822 may allow a user to make changes to one or more visual media content.

Storyboard panel 822 may present one or more visual media content based on the order and/or duration of the visual media content. For example, a user may have selected Video A, Video C, and Video F from video list panel 821 for inclusion in a video presentation. Storyboard panel 822 may present Video A, Video C, and Video F in the order selected by the user (e.g., Video C, then Video A, then Video F, etc.). Storyboard panel 822 may allow a user to change the order of selected visual media content. Storyboard panel 822 may present Video A, Video C, and Video F based on the duration of the visual media content. For example, the sizes of video A, Video C, and Video F in storyboard panel 822 may correspond to the durations of video A, Video C, and Video F in the video presentation.

In one aspect of the disclosure, video clips may be automatically edited to be synchronized for accompaniment by similar audio tracks. Video clips may be automatically edited by determining occurrences of video events within the preliminary version of the video clip. A repository of audio tracks including a first audio track, a second audio track, a first set of audio event markers, and a second set of audio event markers may be accessed. First revised instructions defining a first revised version of the video clip may be determined. The first revised version of the video clip may be synchronized with the first audio track so that one or more moments within the first video segment of the video clip corresponding to one or more occurrences of video events are aligned with one or more moments within the first audio track corresponding to one or more audio event marker. Responsive to a user's selection of the first audio track, playback of the first revised version of the video clip, along with the first audio track as accompaniment, may be effectuated.

One or more other audio tracks similar to the first audio track may be identified. One or more other audio tracks similar to the first audio track may include the second audio track. Second revised instructions defining a second revised version of the video clip may be determined. The second revised version of the video clip may be synchronized with the second audio track so that one or more moments within the second video segment of the video clip corresponding to one or more occurrences of video events are aligned with one or more moments within the second audio track corresponding to one or more audio event marker. Responsive to a user's selection of the second audio track, playback of the second revised version of the video clip, along with the second audio track as accompaniment, may be effectuated.

Referring to FIG. 1B, system 10B may be configured to automatically edit video clips to synchronize accompaniment by similar audio tracks. Machine readable instructions 100B may include one or more of occurrence component 102B, audio track component 104B, GUI component 106B, revised instruction component 108B, playback component 110B, similar audio track component 112B, and/or other components.

Occurrence component 102B may be configured to determine occurrences of video events within a video clip. Occurrence component 102B may operate in system 10B as occurrence component 102A may operate in system 10A. Individual occurrences of video events may correspond to different moments within the video clip. In some implementations, one or more video events may include one or more of a video edit, a user-specified video event, a video transition, a moment of interest, and/or other video events at corresponding moments within the preliminary version of the video clip. In some implementations, a video transition may include one or more of a change in scene, a change in action, a change in view, and/or other video transitions at corresponding moments within the preliminary version of the video clip.

Audio track component 104B may be configured to access a repository of audio tracks. Audio track component 104B may operate in system 10B as audio track component 104A may operate in system 10A. The repository of audio tracks may include a first audio track, a second audio track, other audio tracks, a first set of audio event markers including one or more audio event markers, a second set of audio event markers including one or more audio event markers, and/or other sets of audio event markers. Individual audio event markers of the first set of audio event markers may correspond to different moments within the first audio track. Individual audio event markers of the second set of audio event markers may correspond to different moments within the second audio track.

In some implementations, one or more audio event markers may indicate one of more of a beat, a tempo, a rhythm, an instrument, a volume, a vocal, a frequency, a style, a start, an end, and/or other audio events of the audio tracks at corresponding moments within the audio tracks. In some implementations, one or more audio event markers may indicate one of more of a change in one of more of a beat, a tempo, a rhythm, an instrument, a volume, a vocal, a frequency, a style, a start, an end, and/or other audio events of the audio tracks at corresponding moments within the audio tracks. One or more audio event markers may include a user-specified audio event marker.

In some implementations, audio track component 104B may be configured to obtain an audio filter parameter. The audio filter parameter may define one or more criteria for filtering one or more audio tracks. Audio track component 104B may be configured to determine, by comparing the individual audio tracks with the audio filter parameter, whether the individual audio tracks meet the audio filter parameter. In some implementations, audio track component 104B may be configured to determine the audio filter parameter based on user input. In some implementations, the audio filter parameter may include one or more of a beat parameter, a tempo parameter, a rhythm parameter, an instrument parameter, a volume parameter, a vocal parameter, a frequency parameter, a style parameter, a genre parameter, a performer parameter, a composer parameter, a lyric parameter, a user-specified audio filter parameter, and/or other audio filter parameters.

GUI component 106B may be configured to effectuate presentation of audio tracks on a graphical user interface of a video application. The video application may allow for selection of a first audio track by a user to use as accompaniment for a first video segment of a video clip. For example, GUI component 106B may allow for selection of an audio track by a user to use as accompaniment for first video segment 411 (shown in FIG. 4). GUI component 106B may operate in system 10B as GUI component 106A may operate in system 10A. In some implementations, GUI component 106B may be configured to effectuate presentation of the audio tracks that meets the audio filter parameter on the graphical user interface of the video application for selection by the user to use as accompaniment for a video segment of a video clip.

GUI component 106B may be configured to effectuate presentation of one or more audio tracks similar to the first audio track on the graphical user interface of the video application for selection by the user to use as accompaniment for a second video segment of the video clip. For example, GUI component 106B may allow for selection of an audio track by a user to use as accompaniment for second video segment 412 (shown in FIG. 4).

Revised instruction component 108B may be configured to determine revised instructions defining a revised version of the video clip that is synchronized with the audio track. Revised instruction component 108B may operate in system 10B as revised instruction component 108A may operate in system 10A. For example, revised instruction component 108B may synchronize a first revised version of the video clip so that one or more moments within first video segment 411 (shown in FIG. 4) of the video clip corresponding to one or more occurrences of video events are aligned with one or more moments within the first audio track corresponding to one or more audio event markers. Revised instruction component 108B may synchronize a second revised version of the video clip so that one or more moments within second video segment 412 (shown in FIG. 4) of the video clip corresponding to one or more occurrences of video events are aligned with one or more moments within the second audio track corresponding to one or more audio event markers.

In some implementations, revised instruction component 108B may determine revised instructions for one or more audio tracks presented on the graphical user interface of the video application. In some implementations, revised instruction component 108B may determine revised instructions for one or some of the audio tracks presented on the graphical user interface of the video application. In some implementations, revised instruction component 108B may determine revised instructions for all of the audio tracks presented on the graphical user interface of the video application. In some implementations, revised instruction component 108B may determine revised instructions for one or more audio tracks presented on the graphical user interface of the video application in response to a user's selection of the one or more audio tracks.

In some implementations, determining revised instructions may include changing prior instructions to include one or more of a video timing effect, a video fading effect, and/or other video effects. In some implementations, a video timing effect may include one or more of a slow motion effect, a fast motion effect, a time freeze effect, and/or other video timing effects. In some implementations, a video fading effect may include one or more of a fade-in effect, a fade-out effect, and/or other video fading effects.

Playback component 110B may be configured to, responsive to a user's selection of an audio track, effectuate playback of a video clip along with the audio track as accompaniment. Playback component 110B may operate in system 10B as playback component 110A may operate in system 10A. For example, a user may be presented with playback of the first revised version of the video clip along with the first audio track as accompaniment and/or the second revised version of the video clip along with the second audio track as accompaniment. A user may be presented with playback of the first revised version of the video clip and/or the second revised version of the video clip through the graphical user interface of the video application. For example, playback panel 804 may present playback of the first revised version of the video clip and/or the second revised version of the video clip.

Similar audio track component 112B may be configured to identify one or more other audio tracks similar to the first audio track. One or more other audio tracks similar to the first audio track may include the second audio track. Similar audio track component 112B may identify one or more other audio tracks similar to the first audio track based on an audio characteristic parameter of the first audio track and audio characteristic parameters of the other audio tracks.

In some implementations, similar audio track component 112B may identify one or more other audio tracks similar to the first audio track in response to a user's selection of the first audio track as accompaniment for first video segment 411. In some implementations, similar audio track component 112 may identify one or more other audio tracks similar to the first audio track in response to an indication from a user that the first audio track is acceptable as accompaniment for first video segment 411.

An audio characteristic parameter may define one or more characteristics of the audio tracks. An audio characteristic parameter may include one or more parameters that characterize an audio track at a point in time within the audio track, a duration of time within the audio track, or the entire duration of the audio track. By way of non-limiting example, an audio characteristic parameter may include one or more of a beat parameter, a tempo parameter, a rhythm parameter, an instrument parameter, a volume parameter, a vocal parameter, a frequency parameter, a style parameter, a genre parameter, a performer parameter, a composer parameter, a lyric parameter, and/or other audio characteristic parameters.

Audio parameter panel 802 may present information related to one or more parameters of audio tracks. For example, audio parameter panel 802 may present information related to one or more audio characteristic parameters of the first audio track. In some implementations, audio parameter panel 802 may allow a user to determine one or more audio characteristic parameters of the first audio track based on user input.

For example, a user may determine an audio characteristic parameter of the first audio track by entering information relating to the audio characteristic parameter (e.g., a tempo, etc.) via a keyboard, a touchscreen, a button, and/or other user-input devices. A user may determine an audio characteristic parameter of the first audio track by clicking on one or more buttons in audio parameter panel 802 corresponding to one or more audio characteristic parameters (e.g., a genre, etc.). One or more audio characteristic parameters of the first audio track may be determined in other ways.

Similar audio track component 112B may be configured to compare individual audio tracks with an audio characteristic parameter of the first audio track. For example, similar audio track component 112A may compare a particular audio characteristic parameter (e.g., a tempo, etc.) of the first audio track with the particular audio characteristic parameter of individual audio tracks (e.g., tempo of audio tracks, etc.). Based on a user's clicking a button in audio parameter panel 802 corresponding to a particular audio characteristic parameter (e.g., a genre, etc.), similar audio track component 112B may compare the particular audio characteristic parameter of the first audio track with the particular audio characteristic parameter of individual audio tracks (e.g., genre of audio tracks, etc.). Other types of comparison of individual audio track with one or more audio characteristic parameters are contemplated.

Based on the comparison, similar audio track component 112B may be configured to determine whether the individual audio tracks are similar to the first audio track. For example, similar audio track component 112B may determine that a particular audio track is similar to the first audio track if the particular audio track matches the audio characteristic parameter of the first audio track (e.g., tempo of the particular audio track matches the tempo of the first audio track, genre of the particular audio track matches the genre of the first audio track, etc.). Similar audio track component 112B may determine that a particular audio track is similar to the first audio track if the particular audio track falls within a range of the audio characteristic parameter of the first audio track (e.g., tempo of the particular audio tracks is equal to or within certain range of the tempo of the first audio track, etc.).

In some implementations, identification of other audio tracks similar to the first audio track may be based on a user's history of selecting audio tracks. Similar audio track component 112B may store a user's selection of audio tracks for use as accompaniment for video clips. Similar audio track component 112B may compare individual audio tracks with an audio characteristic parameter of the first audio track and/or audio characteristic parameters of one or more previously selected audio tracks.

The audio characteristic parameter of the first audio track and the audio characteristic parameter of the previously selected audio tracks may be of same type or different types. For example, similar audio track component 112B may use a particular audio characteristic parameter of the first audio track (e.g., a tempo, etc.) and the same particular audio characteristic parameters of one or more previously selected audio tracks (e.g., a tempo, etc.) to identify one or more other audio tracks similar to the first audio track. Similar audio track component 112B may use a particular audio characteristic parameter of the first audio track (e.g., a tempo, etc.) and a different audio characteristic parameters of one or more previously selected audio tracks (e.g., a genre, etc.) to identify one or more other audio tracks similar to the first audio track. Similar audio track component 112B may use a particular audio characteristic parameter of the first audio track (e.g., a tempo, etc.), the same particular audio character parameter of one or more previously selected audio tracks (e.g., a tempo, etc.) and a different audio characteristic parameters of other previously selected audio tracks (e.g., a genre, etc.) to identify one or more other audio tracks similar to the first audio track.

In some implementations, a repository of audio tracks may include a third audio track. Similar audio track component 112B may be configured to register a user's rejection of the third audio track for use as an accompaniment for a video clip or a segment of a video clip. Rejection of the third audio track may be registered based on user input indicating that the third audio track is not accepted as an accompaniment for a video clip (e.g., a user clicking a down-vote button for the third audio track, etc.), and/or based on a user's selection of another audio track as an accompaniment for a video clip (e.g., a user is presented with three audio tracks, and user's selection of one audio track as accompaniment for a video clip is registered as the user's rejection of the other two audio tracks, etc.).

Similar audio track component 112B's identification of one or more other audio tracks similar to the first audio track may exclude from the identification individual audio tracks similar to the third audio track. Audio tracks similar to the third audio track may be excluded based on an audio characteristic parameter of the third audio track and the audio characteristic parameters of the other audio tracks.

In some implementations, similar audio track component 112B may be configured to determine the audio characteristic parameter of the third audio track based on user input. For example, audio parameter panel 802 may present information relate to one or more audio characteristic parameters of the third audio track. Audio parameter panel 802 may allow a user to determine one or more audio characteristic parameters of the third audio track based on user input. For example, a user may determine an audio characteristic parameter of the third audio track by entering information relating to the audio characteristic parameter (e.g., a tempo, etc.) via a keyboard, a touchscreen, a button, and/or other user-input devices. A user may determine an audio characteristic parameter of the third audio track by clicking on one or more buttons in audio parameter panel 802 corresponding to one or more audio characteristic parameters (e.g., a genre, etc.). One or more audio characteristic parameters of the third audio track may be determined in other ways.

In some implementations, the audio characteristic parameter of the first audio track and the audio characteristic parameter of the third audio track may be of same type. For example, similar audio track component 112B may use a particular audio characteristic parameter of the first audio track (e.g., a tempo, etc.) to identify one or more other audio tracks similar to the first audio track, and may use the same particular audio characteristic parameter of the third audio track (e.g., a tempo, etc.) to exclude from the identification audio tracks similar to the third audio track.

In some implementations, the audio characteristic parameter of the first audio track and the audio characteristic parameter of the third audio track may be of different types. For example, similar audio track component 112B may use a particular audio characteristic parameter of the first audio track (e.g., a tempo, etc.) to identify one or more other audio tracks similar to the first audio track, and may use a different audio characteristic parameter of the third audio track (e.g., a genre, etc.) to exclude from the identification audio tracks similar to the third audio track.

Although processor 11 and storage medium 12 are shown to be connected to an interface 15 in FIGS. 1A-1B, any communication medium may be used to facilitate interaction between any components of system 10A-10B. One or more components of system 10A-10B may communicate with each other through hard-wired communication, wireless communication, or both. For example, one or more components of system 10A-10B may communicate with each other through a network. For example, processor 11 may wirelessly communicate with storage medium 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIGS. 1A-1B as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIGS. 1A-1B as being co-located within a single processing unit, in implementations in which processor 11 comprises multiple processing units, one or more of computer components may be located remotely from the other computer program components.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. Processor 11 may be configured to execute one or more additional computer program components that may perform some or all of the functionality attributed to one or more of computer program components described herein.

The electronic storage medium of storage medium 12 may be provided integrally (i.e., substantially non-removable) with one or more components of system 10A-10B and/or removable storage that is connectable to one or more components of system 10A-10B via, for example, a port (e.g., a USB port, a Firewire port, etc.) or a drive (e.g., a disk drive, etc.). Storage medium 12 may include one or more of optically readable storage medium (e.g., optical disks, etc.), magnetically readable storage medium (e.g., magnetic tape, magnetic hard drive, floppy drive, etc.), electrical charge-based storage medium (e.g., EPROM, EEPROM, RAM, etc.), solid-state storage medium (e.g., flash drive, etc.), and/or other electronically readable storage medium. Storage medium 12 may be a separate component within system 10A-10B, or storage medium 12 may be provided integrally with one or more other components of system 10A-10B (e.g., processor 11). Although storage medium 12 is shown in FIGS. 1A-1B as a single entity, this is for illustrative purposes only. In some implementations, storage medium 12 may comprise a plurality of storage units. These storage units may be physically located within the same device, or storage medium 12 may represent storage functionality of a plurality of devices operating in coordination.

Figure 2A:
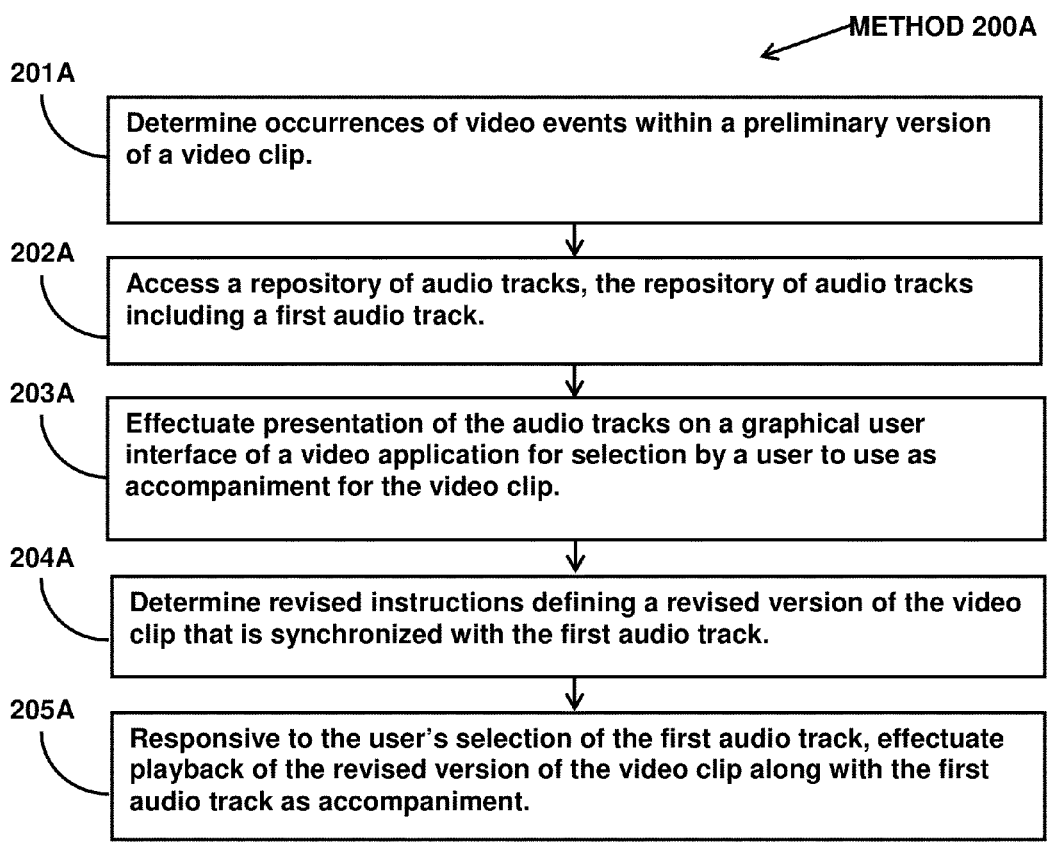
FIG. 2A illustrates a method for automatically editing video clips to synchronize accompaniment by different audio tracks.
Figure 2B:
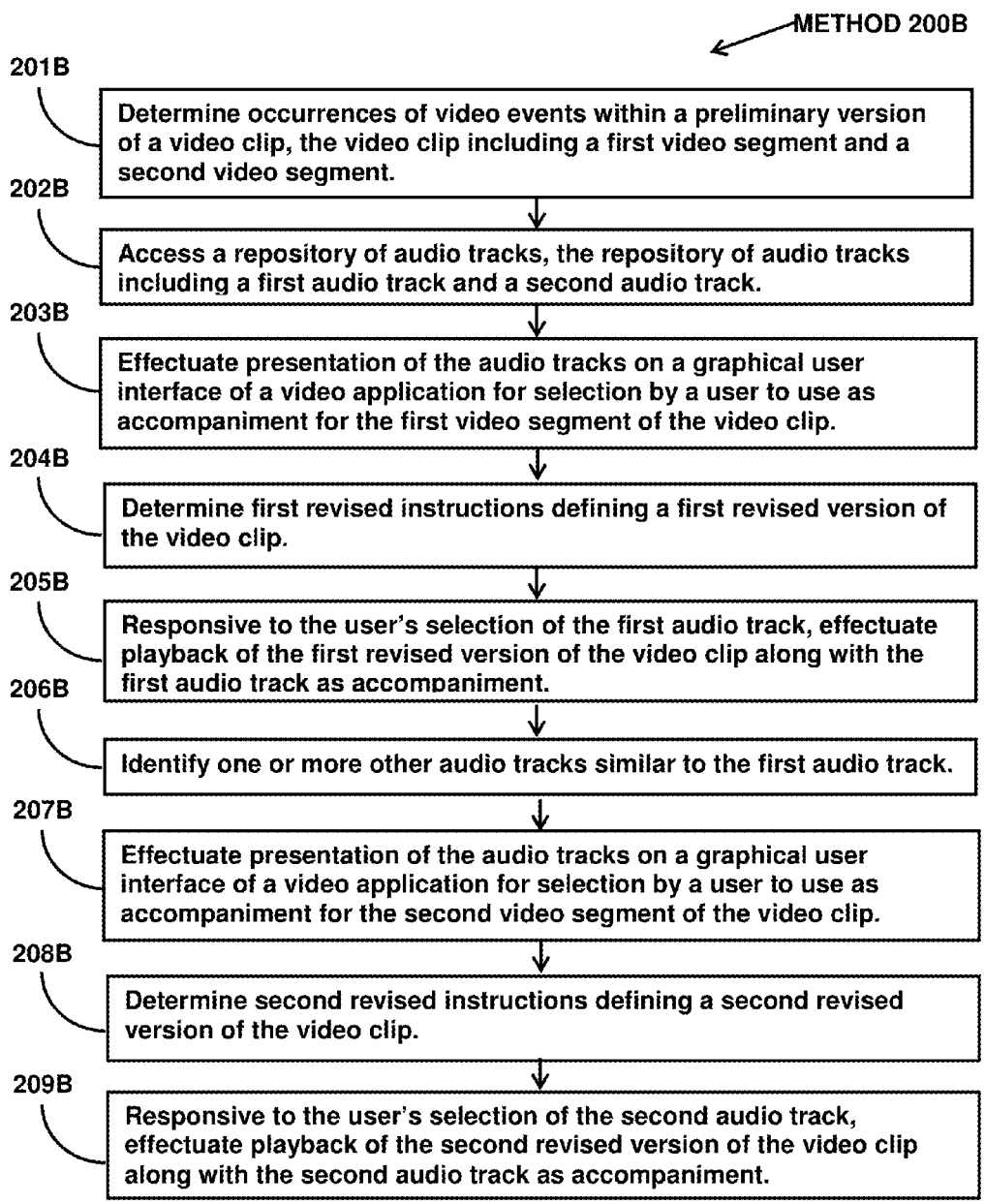
FIG. 2B illustrates a method for automatically editing video clips to synchronize accompaniment by similar audio tracks.

FIGS. 2A-2B illustrate methods 200A-200B for automatically editing video clips to synchronize accompaniment by audio tracks. The operations of methods 200A-200B presented below are intended to be illustrative. In some implementations, methods 200A-200B may be accomplished with one or more additional operations not described, and/or without one or more of the operations discussed. In some implementations, two or more of the operations may occur substantially simultaneously.

In some implementations, methods 200A-200B may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of methods 200A-200B in response to instructions stored electronically on one or more electronic storage mediums. The one or more processing devices may include one or more devices configured through hardware, firmware, and/or software to be specifically designed for execution of one or more of the operations of methods 200A-200B.

Referring to FIG. 2A and method 200A, at operation 201A, occurrences of video events within a preliminary version of an video clip may be determined. Storage medium may store video content and initial instructions defining a preliminary version of the video clip made up from the stored video content. The initial instructions may indicate specific portions of the video content to be included in the preliminary version of the video clip and an order in which the specific portions of the video content should be presented. The individual occurrences of video events may correspond to different moments within the preliminary version of the video clip. In some implementations, operation 201A may be performed by a processor component the same as or similar to occurrence component 102A (shown in FIG. 1A and described herein).

At operation 202A, a repository of audio tracks may be accessed. The repository of audio tracks may include a first audio track and a first set of audio event markers. The individual audio event markers may correspond to different moments within the first audio track. In some implementations, operation 202A may be performed by a processor component the same as or similar to audio track component 104A (shown in FIG. 1A and described herein).

At operation 203A, presentation of the audio tracks on a graphical user interface of a video application for selection by a user to use as accompaniment for the video clip may be effectuated. In some implementations, operation 203A may be performed by a processor component the same as or similar to GUI component 106A (shown in FIG. 1A and described herein).

At operation 204A, revised instructions defining a revised version of the edited video clip that is synchronized with the first audio track may be determined. The revised version of the video clip may be synchronized so that one or more moments within the video clip corresponding to one or more occurrences of video events are aligned with one or more moments within the first audio track corresponding to one or more audio event markers. In some implementations, operation 204A may be performed by a processor component the same as or similar to revised instruction component 108A (shown in FIG. 1A and described herein).

At operation 205A, responsive to the user's selection of the first audio track, playback of the revised version of the video clip along with the first audio track as accompaniment may be effectuated. In some implementations, operation 205A may be performed by a processor component the same as or similar to playback component 110A (shown in FIG. 1A and described herein).

Referring to FIG. 2B and method 200B, at operation 201B, occurrences of video events within a preliminary version of a video clip may be determined. Storage medium may store video content and initial instructions defining a preliminary version of the video clip made up from the stored video content. The video clip may be divided into video segments. The video segments may include a first video segment and a second video segment. The initial instructions may indicate specific portions of the video content to be included in the preliminary version of the video clip and an order in which the specific portions of the video content should be presented. The individual occurrences of video events may correspond to different moments within the preliminary version of the video clip. In some implementations, operation 201B may be performed by a processor component the same as or similar to occurrence component 102B (shown in FIG. 1B and described herein).

At operation 202B, a repository of audio tracks may be accessed. The repository of audio tracks may include a first audio track, a second audio track, a first set of audio event markers, and a second set of audio event markers. The individual audio event markers of the first set of audio event markers may correspond to different moments within the first audio track. The individual audio event markers of the second set of audio event markers may correspond to different moments within the second audio track. In some implementations, operation 202B may be performed by a processor component the same as or similar to audio track component 104B (shown in FIG. 1B and described herein).

At operation 203B, presentation of the audio tracks on a graphical user interface of a video application for selection by a user to use as accompaniment for the first video segment of the video clip may be effectuated. In some implementations, operation 203B may be performed by a processor component the same as or similar to GUI component 106B (shown in FIG. 1B and described herein).

At operation 204B, first revised instructions defining a first revised version of the video clip that is synchronized with the first audio track may be determined. The first revised version of the video clip may be synchronized so that one or more moments within the first video segment of the video clip corresponding to one or more occurrences of video events are aligned with one or more moments within the first audio track corresponding to one or more audio event markers. In some implementations, operation 204B may be performed by a processor component the same as or similar to revised instruction component 108B (shown in FIG. 1B and described herein).

At operation 205B, responsive to the user's selection of the first audio track, playback of the first revised version of the video clip along with the first audio track as accompaniment may be effectuated. In some implementations, operation 205B may be performed by a processor component the same as or similar to playback component 110B (shown in FIG. 1B and described herein).

At operation 206B, one or more other audio tracks similar to the first audio track may be identified. One or more other audio tracks similar to the first audio track may be identified based on an audio characteristic parameter of the first audio track and audio characteristic parameters of the other audio tracks. The other audio tracks may include the second audio track. The audio characteristic parameters may define one or more characteristics of the audio tracks. In some implementations, operation 206B may be performed by a processor component the same as or similar to similar audio track component 112B (shown in FIG. 1B and described herein).

At operation 207B, presentation of the audio tracks on a graphical user interface of a video application for selection by a user to use as accompaniment for the second video segment of the video clip may be effectuated. In some implementations, operation 207B may be performed by a processor component the same as or similar to GUI component 106B (shown in FIG. 1B and described herein).

At operation 208B, second revised instructions defining a second revised version of the video clip that is synchronized with the second audio track may be determined. The second revised version of the video clip may be synchronized so that one or more moments within the second video segment of the video clip corresponding to one or more occurrences of video events are aligned with one or more moments within the second audio track corresponding to one or more audio event markers. In some implementations, operation 208B may be performed by a processor component the same as or similar to revised instruction component 108B (shown in FIG. 1B and described herein).

At operation 209B, responsive to the user's selection of the second audio track, playback of the second revised version of the video clip along with the second audio track as accompaniment may be effectuated. In some implementations, operation 209B may be performed by a processor component the same as or similar to playback component 110B (shown in FIG. 1B and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or

What is claimed is:

1. A system that automatically edits video clips to synchronize accompaniment by different musical tracks, the system comprising:
    one or more non-transitory storage media storing video content and initial instructions defining a preliminary version of an edited video clip made up from the stored video content, the initial instructions indicating specific portions of the video content to be included in the preliminary version of the edited video clip and an order in which the specific portions of the video content should be presented; and
    one or more physical processors configured by machine readable instructions to:
        determine occurrences of video events within the preliminary version of the edited video clip, the individual occurrences of video events corresponding to different moments within the preliminary version of the edited video clip;
        access a repository of musical tracks, the repository of musical tracks including a first musical track, a second musical track, a first set of audio event markers associated with the first musical track, and a second set of audio event markers associated with the second musical track, individual sets of audio event markers including one or more audio event markers, the individual audio event markers associated with the first musical track corresponding to different moments within the first musical track and the individual audio event markers associated with the second musical track corresponding to different moments within the second musical track;
        effectuate presentation of two or more of the musical tracks on a graphical user interface of a video application for selection by a user to use as accompaniment for the edited video clip;
        determine revised instructions defining revised versions of the edited video clip that are synchronized with the two or more of the musical tracks presented on the graphical user interface such that first revised instructions define a first revised version of the edited video clip that is synchronized with the first musical track so that one or more moments within the edited video clip corresponding to one or more occurrences of video events are aligned with one or more moments within the first musical track corresponding to one or more of the audio event markers of the first musical track and second revised instructions define a second revised version of the edited video clip that is synchronized with the second musical track so that one or more moments within the edited video clip corresponding to one or more occurrences of video events are aligned with one or more moments within the second musical track corresponding to one or more of the audio event markers of the second musical track, wherein the revised instructions are determined prior to the user's selection of one or more of the musical tracks;
        effectuate presentation of an audio mixing option on the graphical user interface of the video application for selection by the user, the audio mixing option defining volume at which the musical tracks are played as accompaniment for the edited video clip;
        responsive to the user's selection of the first musical track, effectuate playback of the first revised version of the edited video clip along with the first musical track as accompaniment, the first musical track played at the volume defined by the user selection of the audio mixing option; and
        responsive to the user's selection of the second musical track, effectuate playback of the second revised version of the edited video clip along with the second musical track as accompaniment, the second musical track played at the volume defined by the user selection of the audio mixing option.

2. The system of claim 1, wherein the audio mixing option includes an option to set a percentage of the volume at which the musical tracks are played as accompaniment for the edited video clip.

3. The system of claim 2, wherein the edited video clip includes an audio, and an inverse relationship exists between volume at which the audio of the edited video clip is played and the volume at which the musical tracks are played.

4. The system of claim 3, wherein a hundred percent of the volume for the musical tracks corresponds to a zero percent of the volume for the audio of the edited video clip.

5. The system of claim 3, wherein a zero percent of volume for the musical track corresponds to a hundred percent of volume for the audio of the edited video clip.

6. The system of claim 3, wherein a fifty percent of volume for the musical track corresponds to a fifty percent of volume for the audio of the edited video clip.

7. The system of claim 1, wherein the audio mixing option includes an option to decrease the volume at which the musical tracks are played at a moment in the edited video clip corresponding to a moment of interest.

8. The system of claim 7, wherein the edited video clip includes an audio, and an inverse relationship exists between volume at which the audio of the edited video clip is played and the volume at which the musical tracks are played.

9. The system of claim 7, wherein the moment in the edited video clip corresponding to the moment of interest includes a single point in time corresponding to the moment of interest and a first duration of time preceding the single point in time corresponding to the moment of interest.

10. The system of claim 9, wherein the moment in the edited video clip corresponding to the moment of interest further includes a second duration of time following the single point in time corresponding to the moment of interest.

11. A method for automatically editing video clips to synchronize accompaniment by different musical tracks, the method comprising:

accessing one or more non-transitory storage media storing video content and initial instructions defining a preliminary version of an edited video clip made up from the stored video content, the initial instructions indicating specific portions of the video content to be included in the preliminary version of the edited video clip and an order in which the specific portions of the video content should be presented; and determining occurrences of video events within the preliminary version of the edited video clip, the individual occurrences of video events corresponding to different moments within the preliminary version of the edited video clip;

accessing a repository of musical tracks, the repository of musical tracks including a first musical track, a second musical track, a first set of audio event markers associated with the first musical track, and a second set of audio event markers associated with the second musical track, individual sets of audio event markers including one or more audio event markers, the individual audio event markers associated with the first musical track corresponding to different moments within the first musical track and the individual audio event markers associated with the second musical track corresponding to different moments within the second musical track;

effectuating presentation of two or more of the musical tracks on a graphical user interface of a video application for selection by a user to use as accompaniment for the edited video clip;

determining revised instructions defining revised versions of the edited video clip that are synchronized with the two or more of the musical tracks presented on the graphical user interface such that first revised instructions define a first revised version of the edited video clip that is synchronized with the first musical track so that one or more moments within the edited video clip corresponding to one or more occurrences of video events are aligned with one or more moments within the first musical track corresponding to one or more of the audio event markers of the first musical track and second revised instructions define a second revised version of the edited video clip that is synchronized with the second musical track so that one or more moments within the edited video clip corresponding to one or more occurrences of video events are aligned with one or more moments within the second musical track corresponding to one or more of the audio event markers of the second musical track, wherein the revised instructions are determined prior to the user's selection of one or more of the musical tracks;

effectuating presentation of an audio mixing option on the graphical user interface of the video application for selection by the user, the audio mixing option defining volume at which the musical tracks are played as accompaniment for the edited video clip;

responsive to the user's selection of the first musical track, effectuating playback of the first revised version of the edited video clip along with the first musical track as accompaniment, the first musical track played at the volume defined by the user selection of the audio mixing option; and responsive to the user's selection of the second musical track, effectuating playback of the second revised version of the edited video clip along with the second musical track as accompaniment, the second musical track played at the volume defined by the user selection of the audio mixing option.

12. The method of claim 11, wherein the audio mixing option includes an option to set a percentage of the volume at which the musical tracks are played as accompaniment for the edited video clip.

13. The method of claim 12, wherein the edited video clip includes an audio, and an inverse relationship exists between volume at which the audio of the edited video clip is played and the volume at which the musical tracks are played.

14. The method of claim 13, wherein a hundred percent of the volume for the musical tracks corresponds to a zero percent of the volume for the audio of the edited video clip.

15. The method of claim 13, wherein a zero percent of volume for the musical track corresponds to a hundred percent of volume for the audio of the edited video clip.

16. The method of claim 13, wherein a fifty percent of volume for the musical track corresponds to a fifty percent of volume for the audio of the edited video clip.

17. The method of claim 11, wherein the audio mixing option includes an option to decrease the volume at which the musical tracks are played at a moment in the edited video clip corresponding to a moment of interest.

18. The method of claim 17, wherein the edited video clip includes an audio, and an inverse relationship exists between volume at which the audio of the edited video clip is played and the volume at which the musical tracks are played.

19. The method of claim 17, wherein the moment in the edited video clip corresponding to the moment of interest includes a single point in time corresponding to the moment of interest and a first duration of time preceding the single point in time corresponding to the moment of interest.

20. The method of claim 19, wherein the moment in the edited video clip corresponding to the moment of interest further includes a second duration of time following the single point in time corresponding to the moment of interest.

* * * * *